(12) United States Patent
Minakuti et al.

(10) Patent No.: US 7,545,412 B2
(45) Date of Patent: Jun. 9, 2009

(54) IMAGE-SENSING APPARATUS WITH A SOLID-STATE IMAGE SENSOR SWITCHABLE BETWEEN LINEAR AND LOGARITHMIC CONVERSION

(75) Inventors: Jun Minakuti, Sakai (JP); Koichi Kamon, Sakai (JP); Masayuki Kusuda, Nishinomiya (JP)

(73) Assignee: Konica Minolta Holdings, Inc., Tokyo (JP)

( * ) Notice: Subject to any disclaimer, the term of this patent is extended or adjusted under 35 U.S.C. 154(b) by 896 days.

(21) Appl. No.: 10/773,882

(22) Filed: Feb. 6, 2004

(65) Prior Publication Data
US 2005/0052547 A1 Mar. 10, 2005

(30) Foreign Application Priority Data
Sep. 9, 2003 (JP) ............................. 2003-316534

(51) Int. Cl.
*H04N 9/73* (2006.01)
*H04N 5/235* (2006.01)
*G06K 9/00* (2006.01)
*H04N 3/14* (2006.01)

(52) U.S. Cl. ................. 348/223.1; 348/229.1; 348/280; 382/167

(58) Field of Classification Search ............... 348/223.1, 348/224.1, 229.1, 272, 273, 280, 362, 364, 348/366; 358/516
See application file for complete search history.

(56) References Cited

U.S. PATENT DOCUMENTS

| | | | | |
|---|---|---|---|---|
| 5,481,302 A | * | 1/1996 | Yamamoto et al. | 348/223.1 |
| 6,078,357 A | * | 6/2000 | Yamamoto et al. | 348/234 |
| 6,184,940 B1 | * | 2/2001 | Sano | 348/655 |
| 6,191,408 B1 | * | 2/2001 | Shinotsuka et al. | 250/208.1 |
| 6,770,861 B2 | * | 8/2004 | Hagihara | 250/208.1 |
| 6,927,884 B2 | * | 8/2005 | Takada et al. | 358/513 |
| 6,972,800 B2 | * | 12/2005 | Sano et al. | 348/362 |
| 6,995,791 B2 | * | 2/2006 | Skow | 348/223.1 |
| 7,061,529 B2 | * | 6/2006 | Nakamura | 348/222.1 |
| 2002/0021121 A1 | * | 2/2002 | Nakamura | 324/96 |

FOREIGN PATENT DOCUMENTS

| | | |
|---|---|---|
| JP | 11-313257 A | 11/1999 |
| JP | 2002-010275 A | 1/2002 |
| JP | 2002-077733 A | 3/2002 |
| JP | 2002-290980 A | 10/2002 |

* cited by examiner

*Primary Examiner*—David L Ometz
*Assistant Examiner*—Carramah J Quiett
(74) *Attorney, Agent, or Firm*—Sidley Austin LLP

(57) ABSTRACT

A database obtained based on the photoelectric conversion characteristics for R and G signals and a database obtained based on the photoelectric conversion characteristics for G and B signals are stored in LUTs respectively. Signal value calculators read out the databases from the LUTs respectively and perform white balance processing on the R and B signals respectively.

15 Claims, 17 Drawing Sheets ly, the
present invention relates to an image-sensing apparatus that
performs white balance processing on chrominance signals.

IMAGE-SENSING APPARATUS WITH A SOLID-STATE IMAGE SENSOR SWITCHABLE BETWEEN LINEAR AND LOGARITHMIC CONVERSION

This application is based on Japanese Patent Application No. 2003-316534 filed on Sep. 9, 2003, the contents of which are hereby incorporated by reference.

BACKGROUND OF THE INVENTION

1. Field of the Invention

The present invention relates to an image-sensing apparatus for sensing a color image which is provided with a solid-state image sensor having a plurality of types of color filters so as to output chrominance signals. More particular

2. Description of the Prior Art

Conventionally, a solid-state image sensor that performs linear conversion by converting the amount of incident light linearly for output has a narrow dynamic range, typically a two-digit figure. Thus, when it is used to shoot a subject with a brightness distribution spread over a wide range of brightness, it does not output brightness information outside its dynamic range. As a different type of conventional solid-state image sensor, there has also been proposed one that performs logarithmic conversion by converting the amount of incident light logarithmically for output (see Japanese Patent Application Laid-Open No. H11-313257). A solid-state image sensor of this type has a wide dynamic range, typically a five- to six-digit figure. Thus, when it is used to shoot a subject with a brightness distribution spread over a considerably wide range of brightness, it can convert all the brightness information within the brightness distribution into an electrical signal for output. However, with this solid-state image sensor, its shootable brightness range is so wide as compared with the brightness distribution of the subject that a region with no brightness data appears in a low- or high-brightness region within the shootable brightness range. To overcome these inconveniences, the applicant of the present invention has proposed a solid-state image sensor that is switchable between linear and logarithmic conversion as described above (see Japanese Patent Application Laid-Open No. 2002-77733).

In an image-sensing apparatus provided with such a solid-state image sensor, when the shooting of a color image is achieved by the provision of color filters, the spectral distribution of the light source used for shooting and the differences in transmissivity among the color filters for different colors cause different photoelectric conversion characteristics for different chrominance signals. For this reason, in an image-sensing apparatus that shoots a color image, white balance processing is performed to make the photoelectric conversion characteristics for different chrominance signals identical. For this purpose, the applicant of the present invention has proposed an image-sensing apparatus provided with a solid-state image sensor that performs logarithmic conversion wherein white balance processing is performed by a white balance processing circuit on the basis of the color temperature detected by a color temperature detection circuit (see Japanese Patent Application Laid-Open No. 2002-10275). The applicant of the present invention has also proposed an image-sensing apparatus provided with a solid-state image sensor that performs logarithmic conversion wherein white balance processing is performed by switching offset voltages when an A/D converter performs A/D conversion (see Japanese Patent Application Laid-Open No. 2002-290980).

However, in the image-sensing apparatuses proposed in Japanese Patent Applications Laid-Open Nos. 2002-10275 and 2002-290980, while white balance processing is effective for an image signal outputted from a solid-state image sensor that performs photoelectric conversion only with logarithmic conversion characteristics, it does not work with a solid-state image sensor that performs photoelectric conversion with linear conversion characteristics. Thus, when a solid-state image sensor that can automatically switch between logarithmic and linear conversion characteristics as proposed in Japanese Patent Application Laid-Open No. 2002-77733 is used, it is not possible to obtain a proper white balance by white balance processing using only multiplication and division or addition and subtraction.

SUMMARY OF THE INVENTION

An object of the present invention is to provide an image-sensing apparatus provided with a solid-state image sensor that performs photoelectric conversion with different sets of characteristics in different regions wherein white balance processing is performed properly on signals outputted with either set of characteristics.

To achieve the above object, according to one aspect of the present invention, an image-sensing apparatus is provided with: a solid-state image sensor including a plurality of pixels that perform photoelectric conversion so as to generate output signals that vary with a first characteristic in a first region and with a second characteristic in a second region with respect to the amount of incident light, and a plurality of types of color filters provided in the vicinity of the pixels; and a white balance circuit that performs white balance processing by performing, on at least one of different types of chrominance signals outputted as corresponding to the different types of color filters from the solid-state image sensor, different calculation operations fit respectively for the first and second characteristics in the first and second regions so as to thereby generate new output data.

According to another aspect of the present invention, an image-sensing apparatus is provided with: a solid-state image sensor including a plurality of pixels that perform photoelectric conversion so as to generate output signals that vary with a first characteristic in a first region and with a second characteristic in a second region with respect to the amount of incident light, and a plurality of types of color filters provided in the vicinity of the pixels; and a white balance circuit having a first look-up table in which is stored information with which to perform white balance processing on different types of chrominance signals outputted as corresponding to the different types of color filters from the solid-state image sensor. Here, the first look-up table provides, as output data, signal levels that are corrected, relative to the levels of input chrominance signals, for deviations among the different types of chrominance signals in such a way as to correspond to the first and second regions.

According to still another aspect of the present invention, an image-sensing apparatus is provided with: a solid-state image sensor including a plurality of pixels that perform photoelectric conversion so as to generate output signals that vary with a first characteristic in a first region and with a second characteristic in a second region with respect to the amount of incident light, and a plurality of types of color filters provided in the vicinity of the pixels; and a white balance circuit having a look-up table in which is stored information with which to adjust the white balance among different types of chrominance signals outputted as corresponding to the different types of color filters from the solid-state image sensor. Here, the look-up table provides, as output data, signal levels having white balance processing and processing other than the white balance processing performed thereon.

According to the present invention, by the use of a look-up table, it is possible to perform white balance processing, accurately and with a simple configuration, on the chrominance signals outputted from a solid-state image sensor that operates in a plurality of regions with different characteristics from one another.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Configuration of Image-Sensing Apparatus

Figure 1:
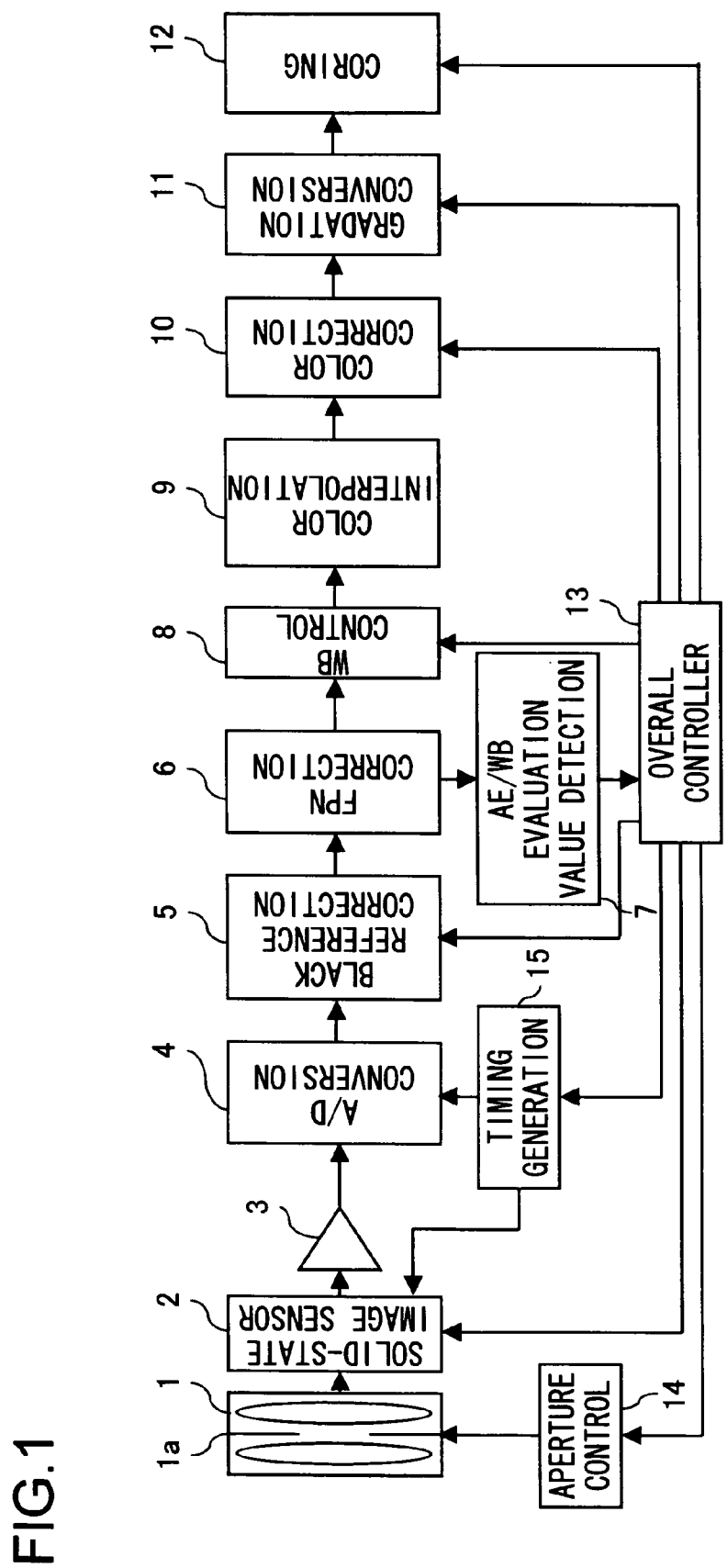
FIG. 1 is a block diagram showing the configuration of an image-sensing apparatus embodying the invention.

The configuration of an image-sensing apparatus embodying the present invention will be described with reference to FIG. 1. FIG. 1 is a block diagram showing the internal configuration of an image-sensing apparatus.

The image-sensing apparatus shown in FIG. 1 includes an optical system 1 composed of a plurality of lens elements; a solid-state image sensor 2 that converts the amount of light incident through the optical system 1 into an electrical signal; an amplifier 3 that amplifies the electrical signal outputted from the solid-state image sensor; an AD conversion circuit 4 that converts the electrical signal amplified by the amplifier 3 into a digital signal; a black reference correction circuit 5 that sets the minimum level of the digital signal outputted from the AD conversion circuit 4; an FPN (fixed pattern noise) correction circuit 6 that eliminates FPN noise resulting from the differences in sensitivity among the individual pixels of the solid-state image sensor 2 from the digital signal corrected with reference to a black reference value by the black reference correction circuit 5; an AE/WB evaluation value detection circuit 7 that detects, from the digital signal having FPN eliminated therefrom by the FPN correction circuit 6, evaluation values to be used to achieve automatic exposure control (AE) and white balance (WB) processing; a WB control circuit 8 that corrects individual chrominance signals so as to obtain a proper color balance in the digital signal having FPN eliminated therefrom by the FPN correction circuit 6; a color interpolation circuit 9 that interpolates the individual chrominance signals on the basis of the chrominance signals of a plurality of adjacent pixels outputted from the WB control circuit 8; a color correction circuit 10 that corrects the individual chrominance signals outputted from the color interpolation circuit 9 with one another so as to correct the hue of the individual pixels; a gradation conversion circuit 11 that performs gradation conversion on the digital signal outputted from the color correction circuit 10; a coring circuit 12 that performs processing such as edge enhancement on the digital signal outputted from the gradation conversion circuit 11; an overall controller 13 that controls the individual circuit blocks; an aperture controller 14 that controls the amount of exposure through an aperture stop 1a provided in the optical system 1; and a timing generation circuit 15 that feeds the solid-state image sensor 2 and the AD conversion circuit 4 with a clock that determines their operation timing.

Figure 2:
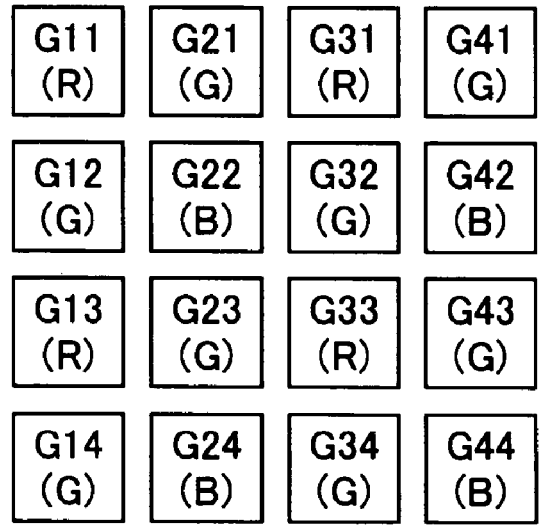
FIG. 2 is a diagram showing how color filters are arranged in the solid-state image sensor.

In the image-sensing apparatus configured as described above, when light is incident through the optical system 1 on the solid-state image sensor 2, which is provided with different color filters for the individual pixels thereof, photoelectric conversion is performed in each pixel, with the individual pixels outputting analog signals as different chrominance signals. Specifically, in a case where the solid-state image sensor 2 is provided with R, G, and B color filters arranged in a Bayer pattern as shown in FIG. 2, the pixels provided with an R color filter output an R signal that represents the red color component, the pixels provided with a G color filter output a G signal that represents the green color component, and the pixels provided with a B color filter output a B signal that represents the blue color component. As will be described later, the solid-state image sensor 2 permits the brightness point at which its operation is switched between linear and logarithmic conversion to be varied as a result of its driving conditions being varied by the overall controller 13. This permits the dynamic range of the solid-state image sensor 2 to be varied. Specifically, as the switching point is moved more to the lower-brightness side, the dynamic range becomes wider.

The R, G, and B signals outputted serially from the solid-state image sensor 2 are amplified by the amplifier 3, and are then converted into digital signals by the AD conversion circuit 4. The R, G, and B signals thus converted into digital signals are then fed to the black reference correction circuit 5, which corrects the black level, i.e., the minimum brightness value, to the reference value (0) on the basis of the dynamic range data, i.e., information on the width of the dynamic range, fed from the overall controller 13. Specifically, since the black level varies with the dynamic range of the solid-state image sensor 2, the reference value is corrected by subtracting the signal level corresponding to the black level from the signal level of each of the R, G, and B signals outputted from the AD conversion circuit 4.

After this black reference correction, the R, G, and B signals have FPN components eliminated therefrom by the FPN correction circuit 6, which achieves that by subtracting the FPN components stored therein from those signals. The FPN components are offset variations resulting from, among others, variations in threshold level among the MOS transistors constituting the individual pixels of the solid-state image sensor 2. When the FPN components are extracted here, for each of the R, G, and B signals, offset values based on the differences in transmissivity among color filters are subtracted from the image signals of the individual pixels outputted from the solid-state image sensor 2 when uniform light is incident. Here, those offset values based on the differences in transmissivity among the different color filters may be calculated from the average values of the R, G, and B signals obtained when uniform light is incident so that the FPN components of the individual pixels are extracted by subtracting those average values from the R, G, and B signals obtained when uniform light is incident. The R, G, and B signals thus having FPN components eliminated therefrom are then fed to the AE/WB evaluation value detection circuit 7 and to the WB control circuit 8.

In the AE/WB evaluation value detection circuit 7, the brightness values of the image signals, composed of the R, G, and B signals fed thereto, are evaluated to calculate the range in which the average brightness values are distributed, i.e., the brightness range of the subject, and the result is fed as an AE evaluation value for setting the amount of exposure to the overall controller 13. On the basis of this AE evaluation value, the overall controller 13 controls the aperture of the aperture stop 1a and thereby controls the amount of exposure. Moreover, in the AE/WB evaluation value detection circuit 7, the ratio and differences in brightness among the R, G, and B signals fed thereto are evaluated to calculate a WB evaluation value to be used as a reference value for white balance processing, and the result is fed to the overall controller 13. In the WB control circuit 8, on the basis of the WB evaluation value and the dynamic range data fed from the overall controller 13, white balance processing is performed so that the R, G, and B signals are subjected to photoelectric conversion with identical characteristics. The AE/WB evaluation value detection circuit 7 and the WB control circuit 8 will be described in detail later.

After being subjected to white balance processing by the WB control circuit 8, the R, G, and B signals are then subjected to color interpolation processing by the color interpolation circuit 9. In a case where the solid-state image sensor 2 is provided with R, G, and B color filters arranged in a Bayer pattern as shown in FIG. 2, the individual pixels output only chrominance signals corresponding to the color filters with which they are provided. Thus, in the color interpolation circuit 9, color interpolation processing is performed by generating the other chrominance signals from the chrominance signals of the adjacent pixels.

In a case where R, G, and B color filters are arranged for individual pixels G11 to G44 as shown in FIG. 2, the pixels G11, G31, G13, and G33 output R signals r11, r31, r13, and r33; the pixels G21, G41, G12, G32, G23, G43, G14, and G34 output G signals g21, g41, g12, g32, g23, g43, g14, and g34; and the pixels G22, G42, G24, and G44 output B signals b22, b42, b24, and b44. In this case, the R, G, and B signals of the pixels G22, G23, G32, and G33 are given by the following formulae.

The R signal r22, the G signal g22, and the B signal b22 of the pixel G22:

$$r22=(r11+r31+r13+r33)/4$$

$$g22=(g21+g12+g32+g23)/4$$

$$b22=b22$$

The R signal r32, the G signal g32, and the B signal b32 of the pixel G32:

$$r32=(r31+r33)/2$$

$$g32=g32$$

$$b32=(b22+b42)/2$$

The R signal r23, the G signal g23, and the B signal b23 of the pixel G23:

$$r23=(r13+r33)/2$$

$$g23=g23$$

$$b23=(b22+b24)/2$$

The R signal r33, the G signal g33, and the B signal b33 of the pixel G33:

$$r33=r33$$

$$g33=(g32+g23+g43+g34)/4$$

$$b33=(b22+b42+b24+b44)/4$$

As a result of this color interpolation processing, the R, G, and B signals of each pixel are obtained, which are then fed to the color correction circuit 10 so as to be subjected to color correction processing for the enhancement of the hue of the individual pixels. Here, the R, G, and B signals are subjected to color correction on the basis of the values of the chrominance signals of one another. Specifically, the R, G, and B signals rk1, gk1, and bk1 of the pixel Gk1 are substituted in the formula below to generate the R, G, and B signals rxk1, gxk1, and bxk1 of the hue-corrected pixel Gk1. Here, the matrix coefficients a1 to a3, b1 to b3, and c1 to c3 are switched on the basis of the dynamic range control signal fed from the overall controller 13 to enhance the hue of the individual pixels determined by their respective R, G, and B signals.

$$rxk1=a1 \times rk1+a2 \times gk1+a3 \times bk1$$

$$gxk1=b1 \times rk1+b2 \times gk1+b3 \times bk1$$

$$bxk1=c1 \times rk1+c2 \times gk1+c3 \times bk1$$

Figure 3:
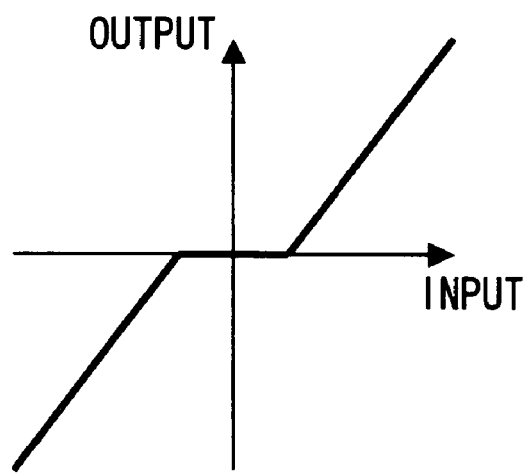
FIG. 3 is a graph showing the level conversion characteristics of the coring circuit on edge components.

After being subjected to color correction by the color correction circuit 10, the R, G, and B signals are fed to the gradation conversion circuit 11 so that their gradation characteristics are varied by being varied according to a gamma curve or by varying digital gains on the basis of the dynamic range control signal and the AE evaluation value fed from the overall controller 13 so as to have appropriate output levels. Then, in the coring circuit 12, which has level conversion characteristic such that, with respect to edge components, all outputs within a predetermined range relative to the reference signal level are converted to the reference signal level as shown in FIG. 3, the R, G, and B signals are subjected to noise elimination, whereby the noise component superimposed on each of them is eliminated, and to edge enhancement, whereby the edge components are extracted.

EXAMPLE OF CONFIGURATION OF SOLID-STATE SENSOR

Figure 4:
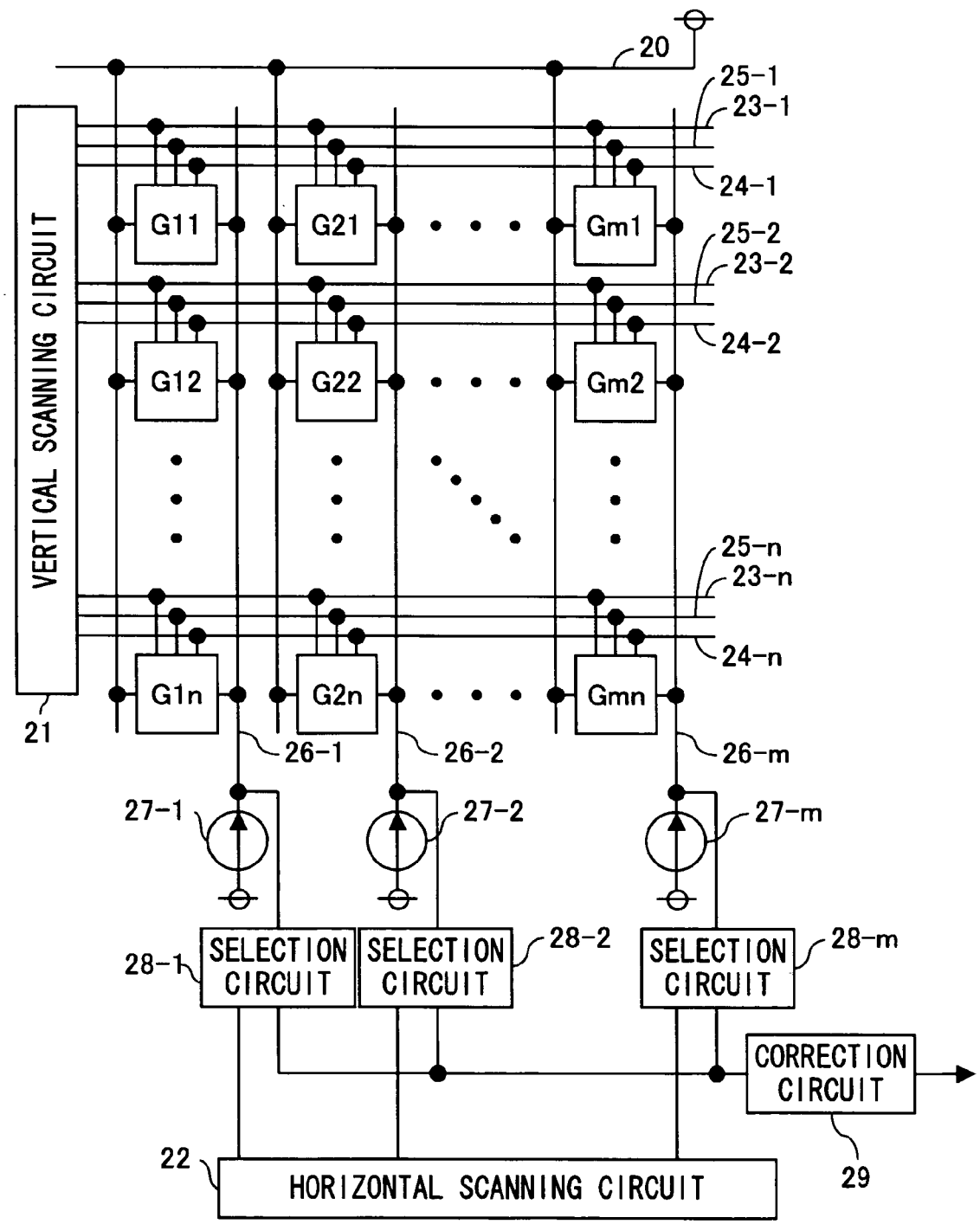
FIG. 4 is a circuit block diagram illustrating the overall configuration of the solid-state image sensor.
Figure 5:
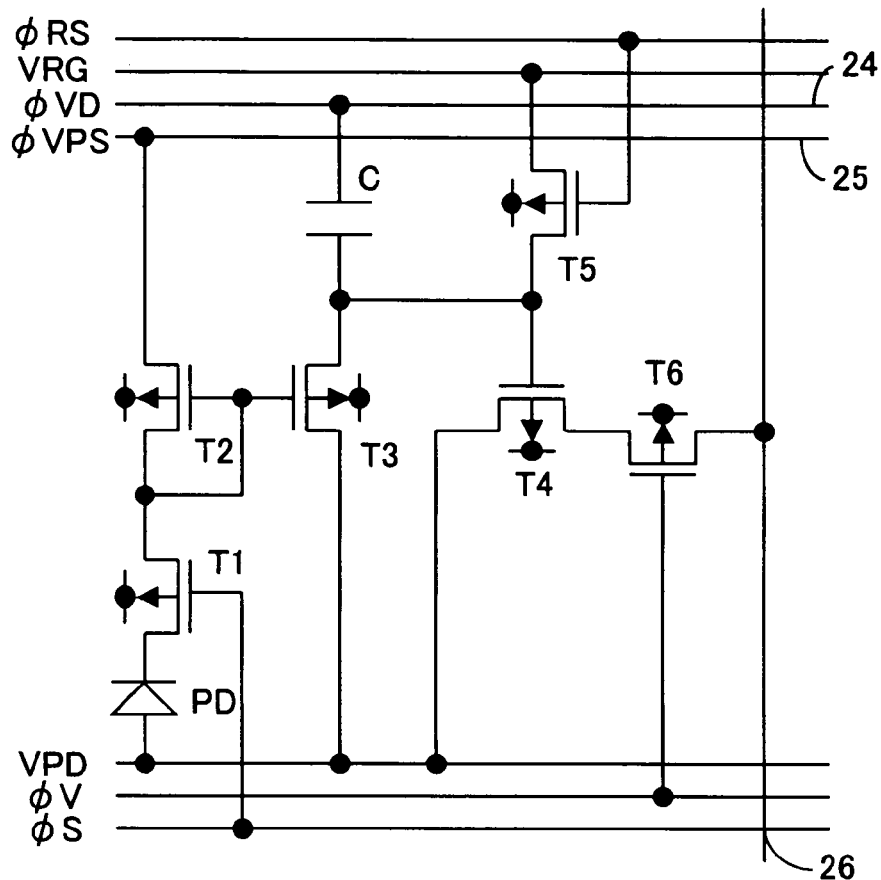
FIG. 5 is a circuit diagram showing an example of the configuration of each pixel of the solid-state image sensor shown in FIG. 4.

The configuration of the solid-state image sensor 2 used in the image-sensing apparatus configured as shown in FIG. 1 will be described with reference to the drawings. FIG. 4 is a block diagram schematically showing the configuration of part of the solid-state image sensor of this example. FIG. 5 is a circuit diagram showing the configuration of each pixel.

As shown in FIG. 4, the solid-state image sensor 2 has pixels G11 to Gmn arrayed in a plurality of rows and columns (in a matrix). Reference numeral 21 represents a vertical scanning circuit, which sequentially scans rows (lines) 23-1, 23-2, . . . , and 23-n by way of which a signal φV is fed to the individual pixels. The vertical scanning circuit 21 also feeds the individual pixels with a signal φVD by way of lines 24-1, 24-2, . . . , and 24-n and with a signal φVPS by way of lines 25-1, 25-2, . . . , and 25-n. Reference numeral 22 represents a horizontal scanning circuit, which sequentially reads out photoelectric conversion signals, pixel by pixel and in the horizontal direction, that are delivered from the pixels to output signal lines 26-1, 26-2, . . . , and 26-m. Reference numeral 20 represents a supply power line. To the individual pixels are connected not only the aforementioned lines 23-1 to 23-n, lines 24-1 to 24-n, lines 25-1 to 25-n, output signal lines 26-1 to 26-m, and supply power line 20, but also other lines (for example, clock lines and bias feed lines), though these are omitted in FIG. 4.

To the output signal lines 26-1 to 26-m are respectively connected constant current sources 27-1 to 27-m and selection circuits 28-1 to 28-m. The selection circuits 28-1 to 28-m sample and hold the image signals and noise signals fed from the pixels G11 to Gmn by way of the output signal lines 26-1 to 26-m. The image signals and noise signals are then sequentially fed from the selection circuits 28-1 to 28-m to a correction circuit 29, which performs correction processing on those signals to feed out image signals having noise eliminated therefrom. The constant current sources 27-1 to 27-m receive, at their one end, a direct-current voltage VPS.

In the solid-state image sensor configured as described above, the outputs of the pixels Gab (where "a" is a natural number in the range 1≦a≦m, and "b" is a natural number in the range 1≦b≦n), namely the image signal and noise signal therefrom, are each outputted by way of the output signal line 26-a and are amplified by the constant current source 27-a connected thereto. The image signal and noise signal outputted from the pixel Gab are fed, one after the other, to the selection circuit 28-a, where those signals are sampled and held. Thereafter, from the selection circuit 28-a, the image signal sampled and held therein is fed to the correction circuit 29, and then the noise signal likewise sampled and held therein is fed to the correction circuit 29. In the correction circuit 29, the image signal fed from the selection circuit 28-a is corrected with the noise signal fed from the selection circuit 28-a, and the image signal thus having noise eliminated therefrom is then fed to the amplifier 3.

In the solid-state image sensor 2 configured as described above, in each of the pixels G11 to Gmn, as shown in FIG. 5, a direct-current voltage VPD is applied to the cathode of a photodiode PD, of which the anode is connected to the drain of a MOS transistor T1. The source of the MOS transistor T1 is connected to the gate and drain of a MOS transistor T2 and to the gate of a MOS transistor T3. The source of the MOS transistor T3 is connected to the gate of a MOS transistor T4 and to the drain of a MOS transistor T5. The source of the MOS transistor T4 is connected to the drain of a MOS transistor T6. The source of the MOS transistor T6 is connected to an output signal line 26 (corresponding to the output signal lines 26-1 to 26-m shown in FIG. 4). The MOS transistors T1 to T6 are all P-channel MOS transistors.

The signal φVPS is fed by way of a line 25 (corresponding to the line 25-1 to 25-n shown in FIG. 4) to the source of the MOS transistor T2, and the direct-current voltage VPD is applied to the drains of the MOS transistors T3 and T4. The signal φVD is fed by way of a line 24 (corresponding to the line 24-1 to 24-n shown in FIG. 4) to one end of a capacitor C, of which the other end is connected to the source of the MOS transistor T3. A direct-current voltage VRG is fed to the source of the MOS transistor T5, and a signal φRS is fed to the gate of the same MOS transistor T5. A signal φS is fed to the gate of the MOS transistor T1, and the signal φV is fed to the gate of the MOS transistor T6.

The signal φVPS is a binary voltage signal that takes either a voltage VL, which makes the MOS transistor T2 operate in a subthreshold region when the amount of incident light is higher than a predetermined level, or a voltage VH, which is higher than the voltage VL and which brings the MOS transistor T2 into a conducting state. The signal φVD is a ternary voltage signal that takes one of the following voltages: a voltage Vh, which is the highest and which makes the capacitor C perform integrating operation, a voltage Vm, which is lower than the voltage Vh and at which the signal φVD is kept when the image signal is read out, or a voltage Vl, which is lower than the voltage Vm and at which the signal φVD is kept when the noise signal is read out.

Figure 6:
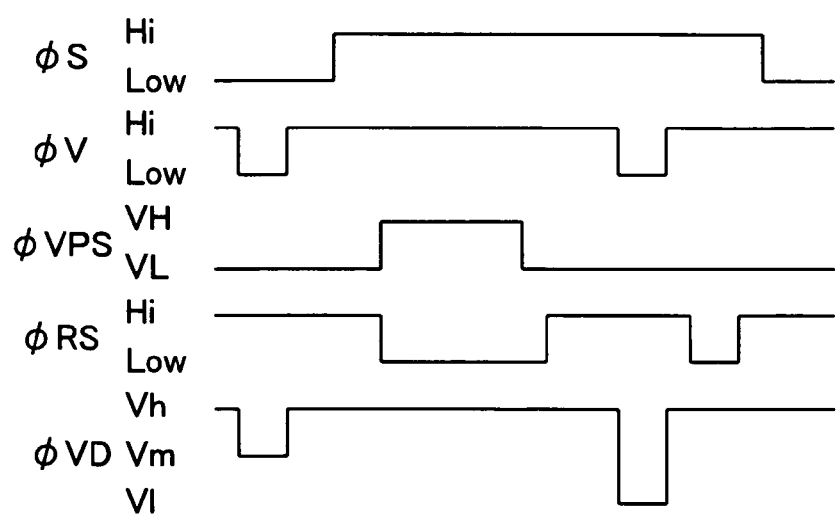
FIG. 6 is a timing chart showing the operation of the pixel shown in FIG. 5.

The operation of the pixels G11 to Gmn in the solid-state image sensor 2 configured as described above will be described with reference to the time chart of FIG. 6. First, a pulse signal having a voltage level Vm as the signal φVD and a pulse signal as the signal φV are fed in, and this causes the image signal to be outputted. Then, the signal φVD is turned to the level Vh and then the signal φS is turned high to turn the MOS transistor T1 off so that resetting is started. Next, the signal φVPS fed to the source of the MOS transistor T2 is turned to the level VH to turn its source voltage high so that the negative electric charge accumulated at the gate and drain of the MOS transistor T2 and at the gate of the MOS transistor T3 is quickly recombined. At this time, the signal φRS is turned low to turn the MOS transistor T5 on so that the voltage at the node between the capacitor C and the gate of the MOS transistor T4 is initialized.

Then, the signal φVPS fed to the source of the MOS transistor T2 is turned to the level VL to bring the MOS transistor T2 back into its original potential state, and then the signal φRS is turned high to turn the MOS transistor T5 off. Thereafter, the capacitor C performs integrating operation, and this makes the voltage at the node between the capacitor C and the gate of the MOS transistor T4 commensurate with the gate voltage of the MOS transistor T2 thus reset. Then, a pulse signal as the signal φV is fed to the gate of the MOS transistor T6 to turn the MCS transistor T6 on, and the signal φVD is turned to the voltage level V1. At this time, the MOS transistor T4 operates as a MOS transistor of a source follower type, and thus a noise signal appears as a voltage signal on the output signal line 26. Thereafter, a pulse signal as the signal φRS is fed again to the MOS transistor T5 to reset the voltage at the node between the capacitor C and the gate of the MOS transistor T4. Then, the signal φS is turned low to bring the MOS transistor T1 into a conducting state. This makes the pixel ready for image sensing.

After the noise signal is outputted in this way, when the MOS transistor T1 is turned on, image sensing is started. At this time, the signal φRS is turned high to turn the MOS transistor T5 off. Moreover, the signal φVPS fed to the source of the MOS transistor T2 is turned to the level VL, and the signal φVD fed to the capacitor C is turned to the voltage level Vh so that the capacitor C performs integrating operation. When an amount of photoelectric charge commensurate with the amount of incident light is fed from the photodiode PD to the MOS transistor T2, since the MOS transistor T2 is now in a cut-off state, the photoelectric charge is accumulated at the gate of the MOS transistor T2.

Accordingly, when the brightness of the subject being shot is low and thus the amount of light incident on the photodiode PD is small, a voltage commensurate with the amount of photoelectric charge accumulated at the gate of the MOS transistor T2 appears at the gate of the MOS transistor T2, and thus a voltage that is linearly proportional to the integral of the amount of incident light appears at the gate of the MOS transistor T3. On the other hand, when the brightness of the subject being shot is high, and thus the amount of light incident on the photodiode PD is large, and thus the voltage commensurate with the amount of electric charge accumulated at the gate of the MOS transistor T2 is high, the MOS transistor T2 operates in a subthreshold region, and thus a voltage natural-logarithmically proportional to the amount of incident light appears at the gate of the MOS transistor T3.

This voltage linearly or natural-logarithmically proportional to the amount of incident light is current-amplified by the MOS transistor T3, and the resulting drain current of this MOS transistor T3 flows through the capacitor C. As a result, the gate voltage of the MOS transistor T4 is a voltage that is linearly or natural-logarithmically proportional to the integral of the amount of incident light. When the signal φVD is turned to the voltage level Vm and a pulse signal as the signal φV is fed to the MOS transistor T6, the source current of the MOS transistor T4, which is commensurate with its gate voltage, flows through the MOS transistor T6 to the output signal line 6. At this time, the MOS transistor T4 operates as a MOS transistor of a source follower type, and thus an image signal appears as a voltage signal on the output signal line 6. Thereafter, the signal φV is turned high to turn the MOS transistor T6 off, and the signal φVD is turned to the voltage level Vh.

Figure 7:
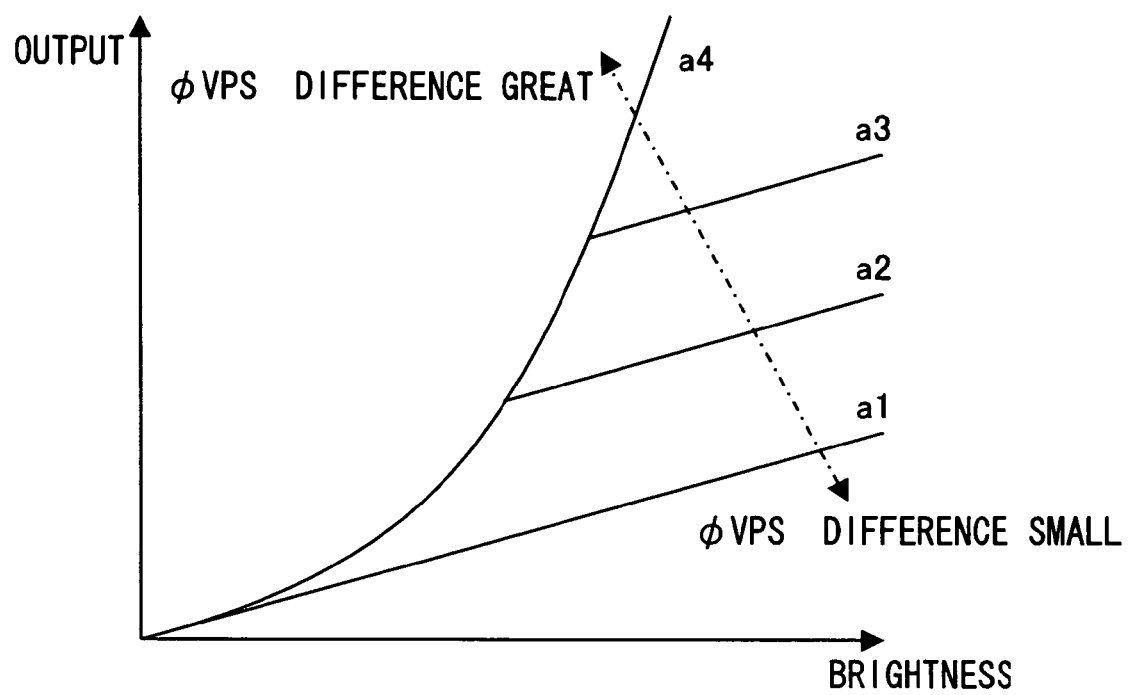
FIG. 7 is a graph showing the relationship between the brightness of the subject and the output of the pixel.

In the operation described above, the lower the voltage level VL of the signal φVPS during image sensing, and thus the greater the difference of that voltage from the voltage level VH of the signal φVPS during resetting, the greater the potential difference between the gate and source of the MOS transistor T2, and thus the larger the proportion of the range of the subject brightness in which the MOS transistor T2 operates in a cut-off state. Thus, as shown in FIG. 7, the lower the voltage level VL, the larger the proportion of the range of the subject brightness in which it is converted linearly. Accordingly, for example, by detecting the brightness range of the subject and then, if the brightness range of the subject is narrow, lowering the voltage level VL to widen the brightness range in which it is converted linearly or, if the brightness range of the subject is wide, raising the voltage level VL to widen the brightness range in which it is converted logarithmically, it is possible to obtain photoelectric conversion characteristics that suit the characteristics of the subject. It is also possible to always perform linear conversion when the voltage level VL is at its minimum and to always perform logarithmic conversion when the voltage level VL is at its maximum.

By letting the overall controller 13 switch the voltage level VL of the signal φVPS fed to the pixels G11 to Gmn of the solid-state image sensor 2 operating as described above, it is possible to realize a solid-state image sensor 2 that permits its dynamic range to be switched according to the brightness range of the subject or the like. Specifically, by letting the overall controller 13 switch the voltage level VL of the signal φVPS, it is possible to set the switching point (a brightness value) at which the pixels G11 to Gmn of the solid-state image sensor 2 switch between linear and logarithmic conversion. Incidentally, the amount of photoelectric charge that flows into the MOS transistor T2 until the gate voltage thereof reaches the level at which the operation switches to logarithmic conversion is equal in all the pixels.

In this example of the configuration, the solid-state image sensor is provided with pixels each configured as shown in FIG. 5. It is, however, also possible to use pixels configured in any other manner, for example as disclosed in Japanese Patent Application Laid-Open No. 2002-77733, so long as each pixel can automatically switch between linear and logarithmic conversion. Moreover, instead of varying the switching point between linear and logarithmic conversion by varying the voltage level VL of the signal φVPS during image sensing, it is possible to vary the switching point between linear and logarithmic conversion by varying the voltage level VH of the signal φVPS during resetting. Alternatively, it is possible to vary the switching point even by varying the resetting time. Furthermore, instead of providing the individual pixels with R, G, and B filters, it is possible to provide them with other color filters such as cyan, magenta, and yellow color filters.

FIRST EXAMPLE OF AE/WB EVALUATION VALUE DETECTION CIRCUIT

Figure 8:
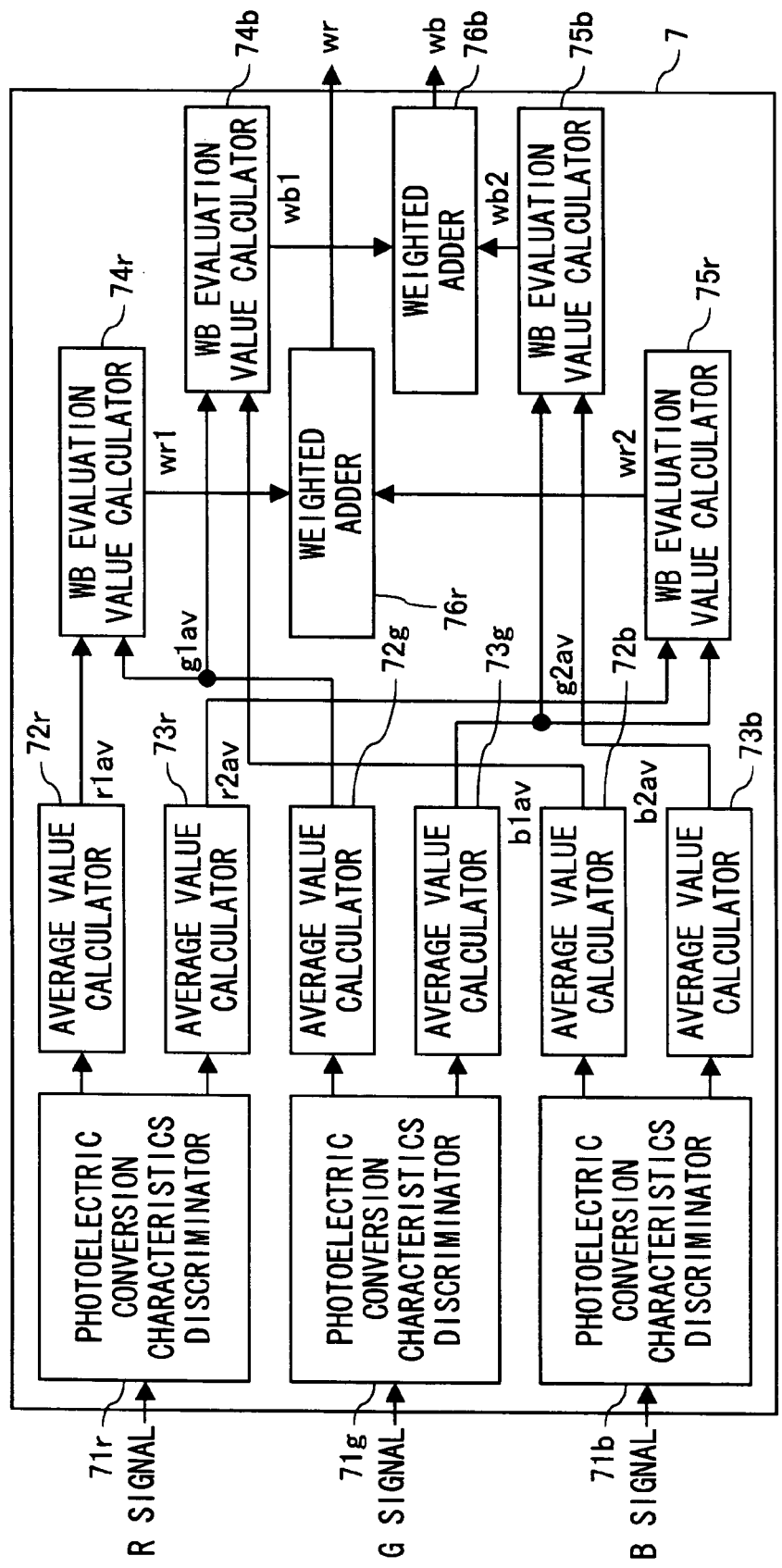
FIG. 8 is a block diagram showing an example of the internal configuration of the AE/WB evaluation value detection circuit.

A first example of the AE/WB evaluation value detection circuit provided in the image-sensing apparatus configured as shown in FIG. 1 will be described in detail below with reference to the drawings. FIG. 8 is a block diagram showing the internal configuration of the AE/WB evaluation value detection circuit of this example.

As shown in FIG. 8, the AE/WB evaluation value detection circuit 7 of this example includes photoelectric conversion characteristics discriminators 71r, 71g, and 71b that respectively receive the R, G, and B signals having the FPN components eliminated therefrom by the FPN correction circuit 6 and that check whether those signals have been subjected to linear or logarithmic conversion; average value calculators 72r, 72g, and 72b that respectively calculate the average values r1av, g1av, and b1av of the R, G, and B signals subjected to linear conversion (having linearly converted characteristics); average value calculators 73r, 73g, and 73b that respectively calculate the average values r2av, g2av, and b2av of the R, G, and B signals subjected to logarithmic conversion (having logarithmically converted characteristics); a WB evaluation value calculator 74r that calculates the WB evaluation value wr1 for the R signal from the average values r1av and g1av of the R and G signals fed respectively from the average value calculator 72r and 72g; a WB evaluation value calculator 74b that calculates the WB evaluation value wb1 for the B signal from the average values g1av and b1av of the G and B signals fed respectively from the average value calculator 72g and 72b; a WB evaluation value calculator 75r that calculates the WB evaluation value wr2 for the R signal from the average values r2av and g2av of the R and G signals fed respectively from the average value calculator 73r and 73g; a WB evaluation value calculator 75b that calculates the WB evaluation value wb2 for the B signal from the average values g2av and b2av of the G and B signals fed respectively from the average value calculator 73g and 73b; a weighted adder 76r that generates a WB evaluation value wr for the R signal by adding together, with appropriate weights, the WB evaluation values wr1 and wr2 fed respectively from the WB evaluation value calculators 74r and 75r and that then outputs the WB evaluation value wr to the overall controller 13; and a weighted adder 76b that generates a WB evaluation value wb for the B signal by adding together, with appropriate weights, the WB evaluation values wb1 and wb2 fed respectively from the WB evaluation value calculator 74b and 75b and that then outputs the WB evaluation value wb to the overall controller 13.

Figure 9:
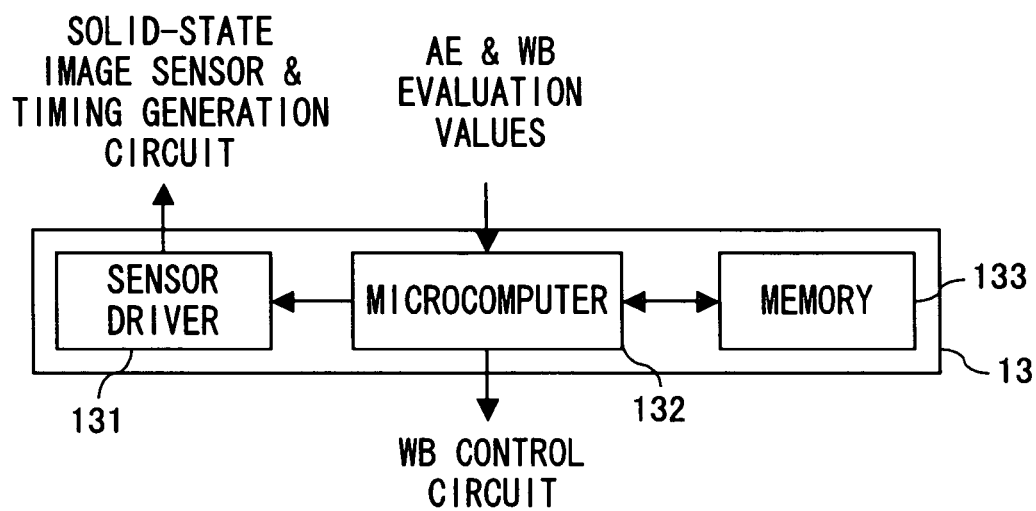
FIG. 9 is a block diagram showing the internal configuration of the overall controller.

As shown in FIG. 9, the overall controller 13 includes a sensor driver 131 that adjusts the dynamic range of the solid-state image sensor 2 and that controls the timing of the clock outputted from the timing generation circuit 15; a microcomputer 132 that controls the sensor driver 131 and generates data to be fed to the WB control circuit 8 according to the AE and WB evaluation values detected by the AE/WB evaluation value detection circuit 7; and a memory 133 in which are stored data that achieve the photoelectric conversion characteristics that suit the dynamic range of the solid-state image sensor 2, i.e., that suits the switching point between linear and logarithmic conversion. The microcomputer 132, for example, feeds the sensor driver 131 with a dynamic range control signal with which the dynamic range of the solid-state image sensor 2 is varied so as to obtain an appropriate dynamic range that suits the brightness range of the subject. On the basis of this dynamic range control signal, the sensor driver 131 varies the driving conditions to vary the dynamic range of the solid-state image sensor 2.

Figure 10:
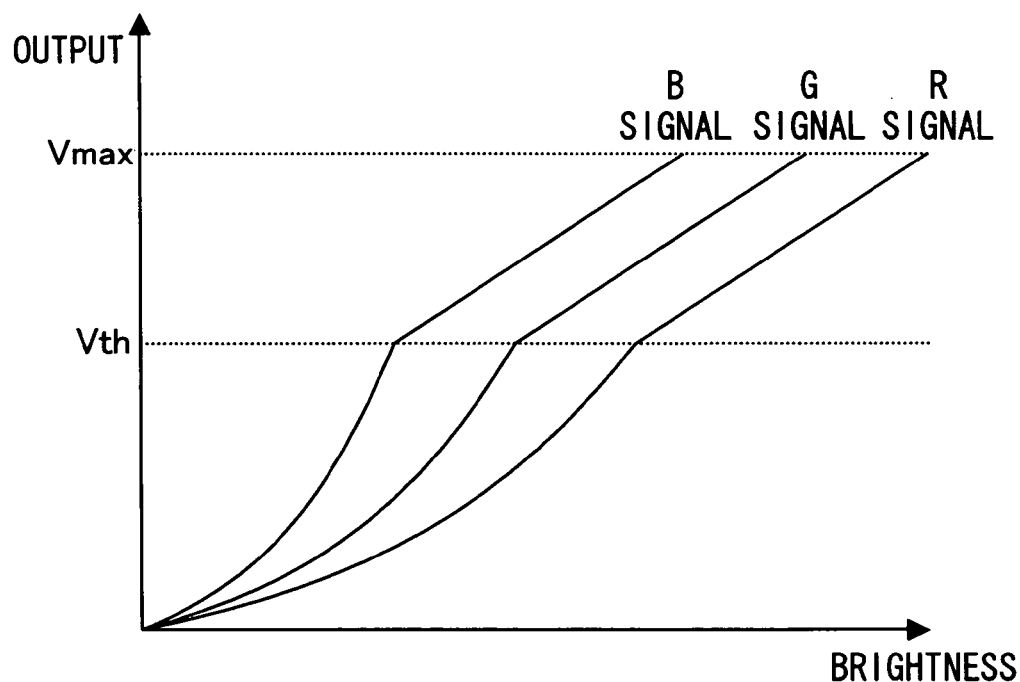
FIG. 10 is a graph showing the relationship between the brightness and the signal levels of the R, G, and B signals.

The operation of the AE/WB evaluation value detection circuit 7 configured as shown in FIG. 8 will be described below with reference to the drawings. First, the R, G, and B signals having FPN components eliminated therefrom by the FPN correction circuit 6 are fed respectively to the photoelectric conversion characteristics discriminators 71r, 71g, and 71b. FIG. 10 shows a typical example of the R, G, and B signals thus fed thereto. FIG. 10 is a graph showing the levels of the R, G, and B signals plotted against the brightness value given in logarithm. Specifically, when the voltage level VH of the signal φVPS fed from the sensor driver 131 to the solid-state image sensor 2 is set according to the dynamic range control signal from the microcomputer 132 of the overall controller 13, offsets are removed by the black reference correction circuit 5 and the FPN correction circuit 6, and this makes substantially equal the potential point, determined by the voltage level VH of the signal φVPS, at which the MOS transistor T2 of the individual pixels switches its operation. As shown in FIG. 10, this makes equal the switching point of all the R, G, and B signals, i.e., the signal levels at which they switch between linear and logarithmic conversion.

Let the switching point of the R, G, and B signals, i.e., the signal level at which they switch between linear and logarithmic conversion, be called the threshold level Vth. Then, when the voltage level VH of the signal φVPS fed to the solid-state image sensor 2 is set by the sensor driver 131 of the overall controller 13, the threshold level Vth is fed, as dynamic range data, from the microcomputer 132 of the overall controller 13 to each of the photoelectric conversion characteristics discriminators 71r, 71g, and 71b. Thus, the photoelectric conversion characteristics discriminators 71r, 71g, and 71b, if the signal level is higher than the threshold level Vth, judges the signal to be a logarithmically converted signal and, if the signal level is equal to or lower than the threshold level Vth, judges the signal to be a linearly converted signal. Here, the photoelectric conversion characteristics discriminators 71r, 71g, and 71b may, if the signal level is equal to or higher than the threshold level Vth, judge the signal to be a logarithmically converted signal and, if the signal level is lower than the threshold level Vth, judge the signal to be a linearly converted signal. This applies throughout the following descriptions.

If the R signal fed to the photoelectric conversion characteristics discriminator 71r is judged to have a signal level equal to or lower than the threshold level Vth and thus be a linearly converted signal, it is fed to the average value calculator 72r; by contrast, if the R signal fed to the photoelectric conversion characteristics discriminator 71r is judged to have a signal level higher than the threshold level Vth and thus be a logarithmically converted signal, it is fed to the average value calculator 73r. Likewise, if the G signal fed to the photoelectric conversion characteristics discriminator 71g is judged to have a signal level equal to or lower than the threshold level Vth and thus be a linearly converted signal, it is fed to the average value calculator 72g; by contrast, if the G signal fed to the photoelectric conversion characteristics discriminator 71g is judged to have a signal level higher than the threshold level Vth and thus be a logarithmically converted signal, it is fed to the average value calculator 73g. Likewise, if the B signal fed to the photoelectric conversion characteristics discriminator 71b is judged to have a signal level equal to or lower than the threshold level Vth and thus be a linearly converted signal, it is fed to the average value calculator 72b; by contrast, if the B signal fed to the photoelectric conversion characteristics discriminator 71b is judged to have a signal level higher than the threshold level Vth and thus be a logarithmically converted signal, it is fed to the average value calculator 73b.

Then, the average value calculators 72r, 72g, and 72b respectively add together the levels of the linearly converted R, G, and B signals fed respectively from the photoelectric conversion characteristics discriminators 71r, 71g, and 71b, and respectively calculate the numbers of the R, G, and B signals fed thereto. Likewise, the average value calculators 73r, 73g, and 73b respectively add together the levels of the logarithmically converted R, G, and B signals fed respectively from the photoelectric conversion characteristics discriminators 71r, 71g, and 71b, and respectively calculate the numbers of the R, G, and B signals fed thereto. When the photoelectric conversion characteristics discriminators 71r, 71g, and 71b finish outputting all the R, G, and B signals in this way, signals indicating the completion of output of all the signals are fed respectively from the photoelectric conversion characteristics discriminator 71r to the average value calculators 72r and 73r, from the photoelectric conversion characteristics discriminator 71g to the average value calculators 72g and 73g, and from the photoelectric conversion characteristics discriminator 71b to the average value calculators 72b and 73b.

Thereafter, in each of the average value calculators 72r, 72g, 72b, 73r, 73g, and 73b, the sum of the signal levels added together is divided by the total number of signals to calculate the average value. Then, the average value r1av of the linearly converted R signals is fed from the average value calculator 72r to the WB evaluation value calculator 74r, the average value g1av of the linearly converted G signals is fed from the average value calculator 72g to the WB evaluation value calculators 74r and 74b, and the average value b1av of the linearly converted B signals is fed from the average value calculator 72b to the WB evaluation value calculator 74b. Likewise, the average value r2av of the logarithmically converted R signals is fed from the average value calculator 73r to the WB evaluation value calculator 75r, the average value g2av of the logarithmically converted G signals is fed from the average value calculator 73g to the WB evaluation value calculators 75r and 75b, and the average value b2av of the logarithmically converted B signals is fed from the average value calculator 73b to the WB evaluation value calculator 75b.

Then, the WB evaluation value calculator 74r, to which the average values r1av and g1av of the linearly converted R and G signals are fed, calculates the WB evaluation value wr1 for the linearly converted R signals on the basis of the average values r1av and g1av of the linearly converted R and G signals and the photoelectric conversion characteristics for the G signals fed from the microcomputer 132 of the overall controller 13. On the other hand, the WB evaluation value calculator 74b, to which the average values g1av and b1av of the linearly converted G and B signals are fed, calculates the WB evaluation value wb1 for the linearly converted B signals on the basis of the average values g1av and b1av of the linearly converted G and B signals and the photoelectric conversion characteristics for the G signals fed from the microcomputer 132 of the overall controller 13.

Likewise, the WB evaluation value calculator 75r, to which the average values r2av and g2av of the logarithmically converted R and G signals are fed, calculates the WB evaluation value wr2 for the logarithmically converted R signals on the basis of the average values r2av and g2av of the logarithmically converted R and G signals and the photoelectric conversion characteristics for the G signals fed from the microcomputer 132 of the overall controller 13. On the other hand, the WB evaluation value calculator 75b, to which the average values g2av and b2av of the logarithmically converted G and B signals are fed, calculates the WB evaluation value wb2 for the logarithmically converted B signals on the basis of the average values g2av and b2av of the logarithmically converted G and B signals and the photoelectric conversion characteristics for the G signals fed from the microcomputer 132 of the overall controller 13. The WB evaluation value calculators 74r, 74b, 75r, and 75b are each fed, from the microcomputer 132 of the overall controller 13, with the photoelectric conversion characteristics for the G signals that suit the dynamic range of the solid-state image sensor 2.

Figure 11A:
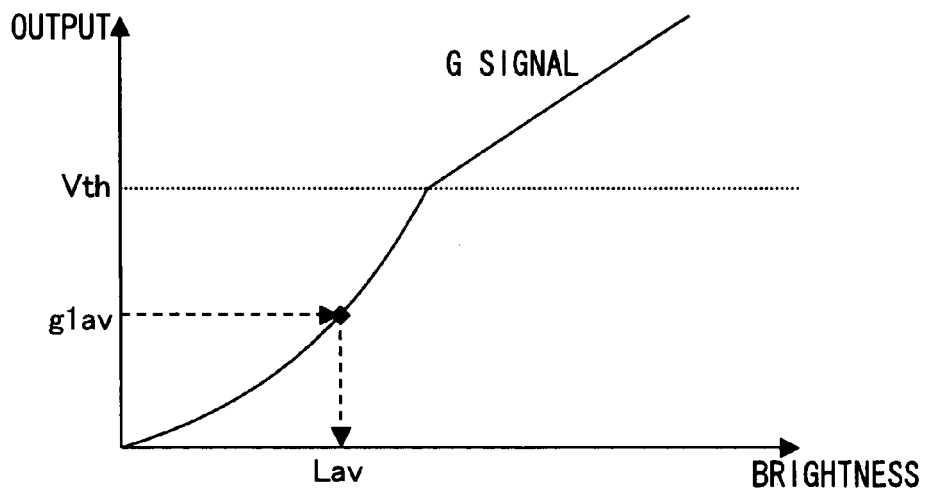
FIGS. 11A to 11C are diagrams showing the operation of the WB evaluation value calculator.

The processing operation of the WB evaluation value calculators 74r, 74b, 75r, and 75b will be described, with the WB evaluation value calculators 74r and 75r taken up as their representatives. Here, it is assumed that photoelectric conversion characteristics for the G signals as shown in FIG. 11A are fed from the microcomputer 132 of the overall controller 13 to the WB evaluation value calculators 74r, 74b, 75r, and 75b. In this case, in the WB evaluation value calculator 74r, first, as shown in FIG. 11A, the brightness value Lav at the average value g1av of the G signals is calculated on the basis of the photoelectric conversion characteristics for the G signals. Specifically, assuming that the linear conversion characteristics region for the G signals is given by formula (1) below, formula (1) can be operated inversely with the average value g1av of the G signals substituted therein to calculate the brightness value Lav ($=$(g1av$-$C)/Ag).

$$V = Ag \times L + C \tag{1}$$

(Here, V represents the signal level, L represents the brightness, Ag represents the photoelectric conversion coefficient for the G signals, and C represents the offset.)

Figure 11B:
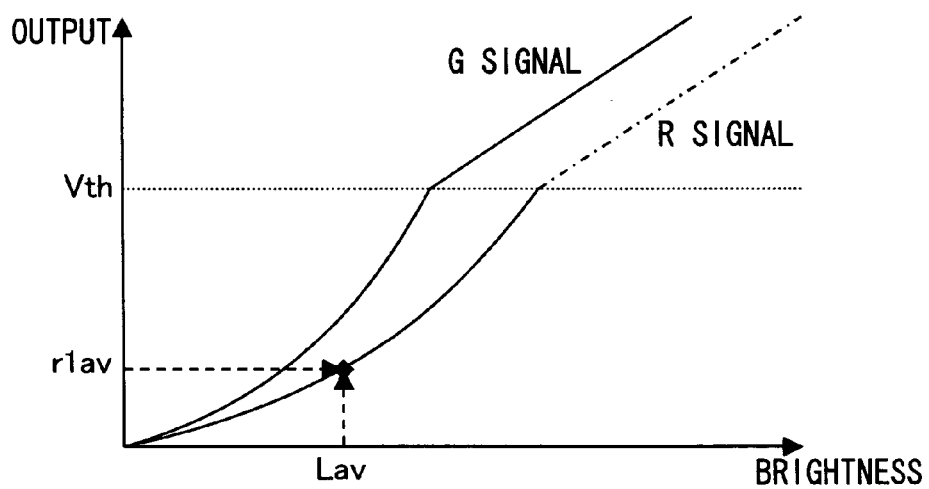

Then, by regarding the average value r1av of the R signals as obtained with respect to the brightness value Lav, the photoelectric conversion coefficient Ar ($=$(r1av$-$C)/Lav) for the R signals is calculated to calculate the photoelectric conversion characteristics for the R signals in the linear conversion characteristics region as shown in FIG. 11B. Here, it is assumed that the linear conversion characteristics region for the R signals is given by formula (2) below, and that the offset C is equal as in formula (1).

$$V = Ar \times L + C \tag{2}$$

Figure 11C:
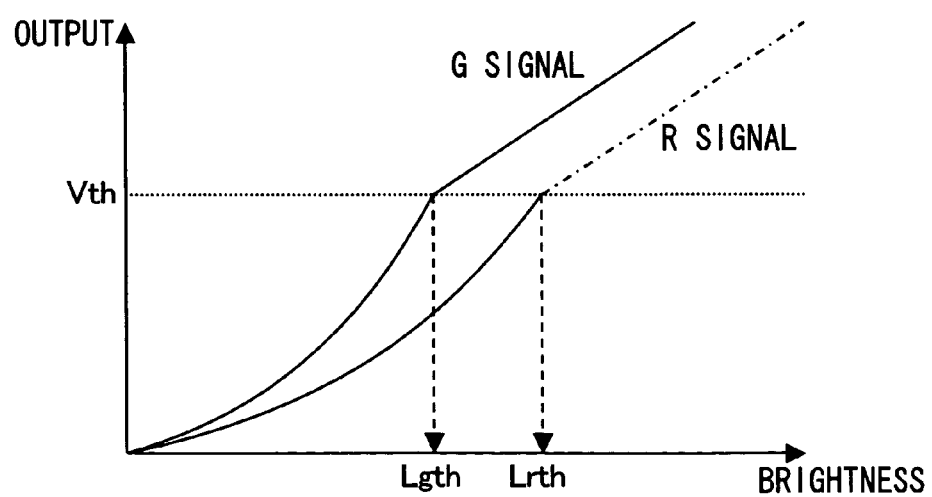

Once the photoelectric conversion characteristics for the R signals in the linear conversion characteristics region are calculated in this way, the brightness values Lrth and Lgth corresponding respectively to the R and G signals at the threshold level Vth are calculated from the photoelectric conversion characteristics for the R and G signals as shown in FIG. 11C. Specifically, formulae (1) and (2) are respectively operated inversely with the threshold level Vth substituted therein to calculate the brightness values Lgth ($=$(Vth$-$C)/Ag) and Lrth ($=$(Vth$-$C)/Ar). From the thus calculated brightness values Lrth and Lgth corresponding respectively to the R and G signals at the threshold level Vth, the WB evaluation value wr1 for the linearly converted R signals is calculated as their difference Lgth$-$Lrth.

Figure 12A:
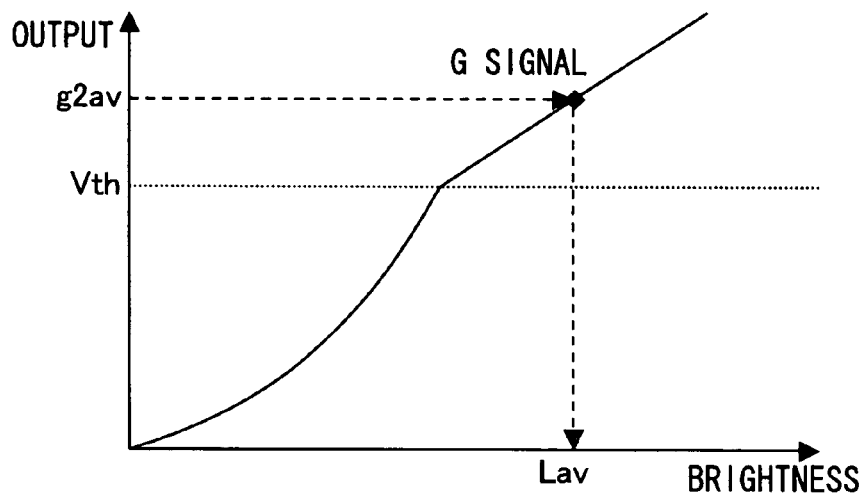
FIGS. 12A to 12C are diagrams showing the operation of the WB evaluation value calculator.

On the other hand, in the WB evaluation value calculator 75r, first, as shown in FIG. 12A, the logarithm of the brightness value 1n(Lav) at the average value g2av of the G signals is calculated from the photoelectric conversion characteristics for the G signals. Specifically, assuming that the logarithmic conversion characteristics region for the G signals is given by formula (3) below, formula (3) is operated inversely with the average value g2av of the G signals substituted therein to calculate the logarithm of the brightness value 1n(Lav) ($=$(g2av$-\beta$g)/$\alpha$). Here, it is assumed that the photoelectric conversion characteristics for the G signals shown in FIGS. 12A to 12C are identical with those shown in FIGS. 11A to 11C.

$$V = \alpha \times 1n(L) + \beta g \tag{3}$$

(Here, $\alpha$ represents a predetermined amplification factor, and $\beta$g represents the logarithmically converted photoelectric conversion coefficient for the G signals.)

Figure 12B:
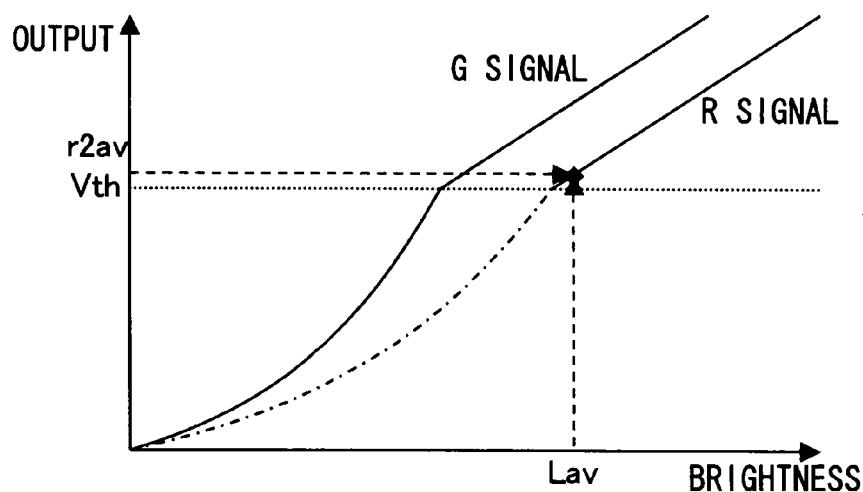
Figure 12C:
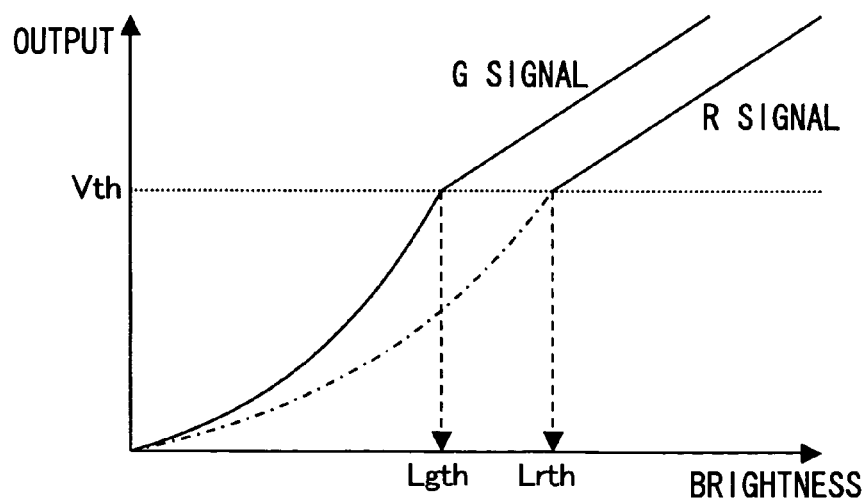

Then, by regarding the average value r2av of the R signals as obtained with respect to the logarithm of the brightness value 1n(Lav), the photoelectric conversion coefficient $\beta$r$=$ (r2av$-\alpha \times$1n(Lav)$=$r2av$-$g2av$+\beta$g) for the R signals is calculated to calculate the photoelectric conversion characteristics for the R signals in the logarithmic conversion characteristics region as shown in FIG. 12B. Here, it is assumed that the logarithmic conversion characteristics region for the R signals is given by formula (4) below, and that the amplification factor a is equal as in formula (3).

$$V = \alpha \times 1n(L) + \beta r \tag{4}$$

Once the photoelectric conversion characteristics for the R signals in the logarithmic conversion characteristics region are calculated in this way, the logarithms of the brightness values 1*n*(Lrth) and 1*n*(Lgth) corresponding respectively to the R and G signals at the threshold level Vth are calculated from the photoelectric conversion characteristics for the R and G signals as shown in FIG. 12C. Specifically, formulae (3) and (4) are respectively operated inversely with the threshold level Vth substituted therein to calculate the logarithms of the brightness values 1*n*(Lgth) (=(Vth−βg)/α) and 1*n*(Lrth) (=(Vth−βr)/α). Eventually, the brightness values Lrth (=exp ((Vth−βr)/α)) and Lgth (=exp((Vth−βg)/α)) corresponding respectively to the R and G signals at the threshold level Vth are calculated. From the thus calculated brightness values Lrth and Lgth corresponding respectively to the R and G signals at the threshold level Vth, the WB evaluation value wr2 for the logarithmically converted R signals is calculated as their difference Lgth−Lrth.

The WB evaluation value calculators 74*r*, 74*b*, 75*r*, and 75*b* each operate in this way to output WB evaluation values wr1, wb1, wr2, and wb2 respectively. The WB evaluation values wr1 and wr2 are fed to the weighted adder 76*r*, and the WB evaluation values wb1 and wb2 are fed to the weighted adder 76*b*. These weighted adders 76*r* and 76*b* are each fed, from the microcomputer 132 of the overall controller 13, with weight coefficients that suit the dynamic range of the solid-state image sensor 2. Thus, assuming that the weighted adder 76*r* is fed with weight coefficients xr and yr for the WB evaluation values wr1 and wr2, it calculates a WB evaluation value wr as given by formula (5) below. On the other hand, assuming that the weighted adder 76*b* is fed with weight coefficients xb and yb for the WB evaluation values wb1 and wb2, it calculates a WB evaluation value wb as given by formula (6) below.

$$wr = xr \times wr1 + yr \times wr2 \quad (5)$$

$$wb = xb \times wb1 + yb \times wb2 \quad (6)$$

The WB evaluation values wb and wr calculated by the weighted adders 76*r* and 76*b* in this way are fed to the microcomputer 132 of the overall controller 13. On the basis of these WB evaluation values wb and wr and the dynamic range data, the microcomputer 132 determines the setting value to be fed to the WB control circuit 8. In this example, the weight coefficients xr, yr, xb, and yb are set according to the dynamic range of the solid-state image sensor 2. It is, however, also possible to let the microcomputer 132 determine those weight coefficients according to the brightness distribution range or brightness value of the subject and feed them to the weighted adders 76*r* and 76*b*. Alternatively, it is possible even to set the weight coefficients xr, yr, xb, and yb from outside.

SECOND EXAMPLE OF AE/WB EVALUATION VALUE DETECTION CIRCUIT

Figure 13:
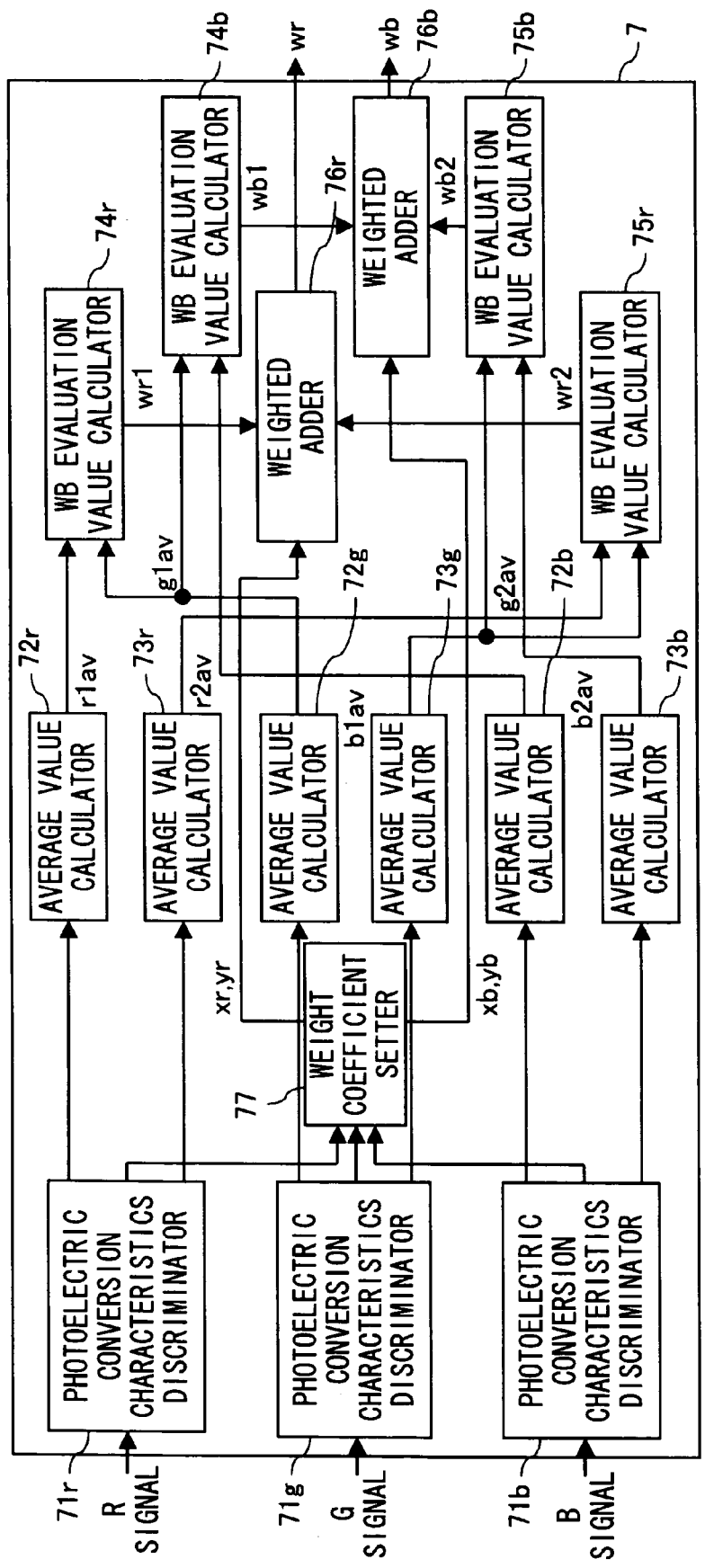
FIG. 13 is a block diagram showing another example of the internal configuration of the AE/WB evaluation value detection circuit.

A second example of the AE/WB evaluation value detection circuit 7 provided in the image-sensing apparatus configured as shown in FIG. 1 will be described in detail below with reference to the drawings. FIG. 13 is a block diagram showing the internal configuration of the AE/WB evaluation value detection circuit of this example. It should be noted that, in the AE/WB evaluation value detection circuit shown in FIG. 13, such circuit blocks as serve the same purposes as in the AE/WB evaluation value detection circuit shown in FIG. 8 are identified with the same reference numerals, and their detailed explanations will not be repeated.

As shown in FIG. 13, the AE/WB evaluation value detection circuit 7 of this example includes photoelectric conversion characteristics discriminators 71*r*, 71*g*, and 71*b*; average value calculators 72*r*, 72*g*, 72*b*, 73*r*, 73*g*, and 73*b*; WB evaluation value calculators 74*r*, 74*b*, 75*r*, and 75*b*; weighted adders 76*r* and 76*b*; and a weight coefficient setter 77 that counts the total number of linearly converted signals and the total number of logarithmically converted signals as discriminated by the photoelectric conversion characteristic discriminators 71*r*, 71*g*, and 71*b* and that then sets the weight coefficients xr, yr, xb, and yb according to those counts.

In this configuration, the photoelectric conversion characteristics discriminators 71*r*, 71*g*, and 71*b*, the average value calculators 72*r*, 72*g*, 72*b*, 73*r*, 73*g*, and 73*b*, the WB evaluation value calculators 74*r*, 74*b*, 75*r*, and 75*b*, and the weighted adders 76*r* and 76*b* operate in the same manner as in the AE/WB evaluation value detection circuit of the first example (FIG. 8). Specifically, the photoelectric conversion characteristics discriminators 71*r*, 71*g*, and 71*b* compare the signal levels of the R, G, and B signals fed thereto with the threshold level Vth and check whether those signals are logarithmically or linearly converted signals. The R, G, and B signals judged to be linearly converted signals by the photoelectric conversion characteristics discriminators 71*r*, 71*g*, and 71*b* are fed to the average value calculators 72*r*, 72*g*, and 72*b*, where their average values r1*av*, g1*av*, and b1*av* are calculated. The R, G, and B signals judged to be logarithmically converted signals by the photoelectric conversion characteristics discriminators 71*r*, 71*g*, and 71*b* are fed to the average value calculators 73*r*, 73*g*, and 73*b*, where their average values r2av, g2*av*, and b2*av* are calculated.

Thereafter, in the WB evaluation value calculator 74*r*, on the basis of the average values r1*av* and g1*av* and the photoelectric conversion characteristics for the G signals, the WB evaluation value wr1 for the linearly converted R signals is calculated, and, in the WB evaluation value calculator 75*r*, on the basis of the average values r2av and g2*av* and the photoelectric conversion characteristics for the G signals, the WB evaluation value wr2 for the logarithmically converted R signals is calculated. Moreover, in the WB evaluation value calculator 74*b*, on the basis of the average values g1*av* and b1*av* and the photoelectric conversion characteristics for the G signals, the WB evaluation value wb1 for the linearly converted B signals is calculated, and, in the WB evaluation value calculator 75*b*, on the basis of the average values g2*av* and b2*av* and the photoelectric conversion characteristics for the G signals, the WB evaluation value wb2 for the logarithmically converted B signals is calculated. Then, in the weighted adder 76*r*, by the use of the weight coefficients xr and yr fed from the weight coefficient setter 77, the WB evaluation values wr1 and wr2 are added together with weights to calculate the WB evaluation value wr, and, in the weighted adder 76*b*, by the use of the weight coefficients xb and yb fed from the weight coefficient setter 77, the WB evaluation values wb1 and wb2 are added together with weights to calculate the WB evaluation value wb.

Here, when the WB evaluation values wr and wb are calculated, as opposed to in the first example, the weight coefficient setter 77 sets the weight coefficients xr, yr, xb, and yb that are fed to the weighted adders 76*r* and 76*b*. Accordingly, now, the operation of this weight coefficient setter 77 will be described. First, when the results of the discrimination performed on the R, G, and B signals by the photoelectric conversion characteristics discriminators 71*r*, 71*g*, and 71*b* are fed to the weight coefficient setter 77, the weight coefficient setter 77, on the basis of the discrimination results fed thereto, counts the total number of linearly converted signals and the total number of logarithmically converted signals. Thus, let the total number of R signals fed from the photoelectric conversion characteristics discriminator 71*r* to the average value calculators 72*r* and 73*r* be n1*r* and n2*r* respectively, let the total number of G signals fed from the photoelectric conversion characteristics discriminator 71*g* to the average value calculators 72*g* and 73*g* be n1*g* and n2*g* respectively, and let the total number of B signals fed from the photoelectric conversion characteristics discriminator 71*b* to the average value calculators 72*b* and 73*b* be n1*b* and n2*b* respectively, then the total number of linearly converted signals is n1 (=n1*r*+n1*g*+n1*b*), and the total number of logarithmically converted signals is n2 (=n2*r*+n2*g*+n2*b*).

Then, according to the ratio of the total number n1 of linearly converted signals to the total number n2 of logarithmically converted signals, the weight coefficients xr, yr, xb, and yb are set. Here, the weight coefficients are set, for example, such that xr=xb=n1/ (n1+n2) and yr=yb=n2/(n1+n2), i.e., so that, the greater the total number of signals, the greater the weight coefficient given to those signals. When the weight coefficients xr, yr, xb, and yb are set in this way, while the weight coefficients xr and yr are fed to the weighted adder 76*r*, the weight coefficients xb and yb are fed to the weighted adder 76*b*.

In the AE/WB evaluation value detection circuit 7 of this example, the weight coefficient setter 77 calculates the weight coefficients xr, yr, xb, and yb by using the total number n1 of linearly converted signals and the total number n2 of logarithmically converted signals as calculated for all the R, G, and B signals collectively. It is, however, also possible to calculate the weight coefficients xr, yr, xb, and yb by using the total numbers n1*r*, n1*g*, and n1*b* of linearly converted signals and the total numbers n2*r*, n2*g*, and n2*b* of logarithmically converted signals as calculated for the R, G, and B signals separately. In that case, it is possible to calculate the weight coefficients xr and yr from the relationship between the total number n1*r* of linearly converted R signals and the total number n2*r* of logarithmically converted R signals and the weight coefficients xb and yb from the relationship between the total number n1*b* of linearly converted B signals and the total number n2*b* of logarithmically converted B signals. Alternatively, it is possible to calculate the weight coefficients xr and yr from the relationship between the total numbers n1*r* and n1*g* of linearly converted R and G signals respectively and the total numbers n2*r* and n2*g* of logarithmically converted R and G signals and the weight coefficients xb and yb from the relationship between the total numbers n1*g* and n1*b* of linearly converted G and B signals and the total numbers n2*g* and n2*b* of logarithmically converted G and B signals.

In a case where an automatic focusing (AF) function for detecting the main subject is provided, the weight coefficients may be set on the basis of the relationship between the number of pixels that output linearly converted signals and the number of pixels that output logarithmically converted signals with respect to the pixels located in an area centered around the main subject detected by the AF function.

In the AE/WB evaluation value detection circuit 7 of the first and second examples described above, the photoelectric conversion characteristics for the G signals are fed to the WB evaluation value calculators 74*r*, 74*b*, 75*r*, and 75*b* to calculate the WB evaluation values wr1, wb1, wr2, and wb2. It is, however, also possible to feed the brightness value L1*av* at the average value of the linearly converted signals to the WB evaluation value calculators 74*r* and 74*b* and the brightness value L2*av* at the average value of the logarithmically converted signals to the WB evaluation value calculators 75*r* and 75*b* to calculate the WB evaluation values wr1, wb1, wr2, and wb2.

In that case, in the WB evaluation value calculator 74*r*, on the basis of the relationship between each of the average values r1*av* and g1*av* of the linearly converted R and G signals respectively and the brightness value L1*av*, the photoelectric conversion characteristics for the R and G signals respectively are discriminated, and the WB evaluation value wr1 is calculated as the difference between the brightness values corresponding respectively to the R and G signals at the threshold level Vth. Likewise, in the WB evaluation value calculator 75*r*, on the basis of the relationship between each of the average values r2*av* and g2*av* of the logarithmically converted R and G signals respectively and the brightness value L2*av*, the photoelectric conversion characteristics for the R and G signals respectively are discriminated, and the WB evaluation value wr2 is calculated. Likewise, in the WB evaluation value calculator 74*b*, on the basis of the relationship between each of the average values g1*av* and b1*av* of the linearly converted G and B signals respectively and the brightness value L1*av*, the photoelectric conversion characteristics for the G and B signals respectively are discriminated, and the WB evaluation value wb1 is calculated. Likewise, in the WB evaluation value calculator 75*b*, on the basis of the relationship between each of the average values g2*av* and b2*av* of the logarithmically converted G and B signals respectively and the brightness value L2*av*, the photoelectric conversion characteristics for the G and B signals respectively are discriminated, and the WB evaluation value wb2 is calculated.

FIRST EXAMPLE OF OVERALL CONTROLLER'S OPERATION FOR GENERATING DATA TABLES

Now, a description will be given of a first example of the operation performed by the overall controller to generate data tables. As a result of the AE/WB evaluation value detection circuit 7 operating as described in connection with its first and second examples above, the WB evaluation values wr and wb are set, which are then fed to the microcomputer 132 of the overall controller 13, which is configured as shown in FIG. 9. The microcomputer 132, when fed with the WB evaluation values wr and wb, reads out the photoelectric conversion characteristics for the R, G, and B signals separately from the memory 133 on the basis of the WB evaluation values wr and wb and the width of the dynamic range set for the solid-state image sensor 2. Then, the microcomputer 132 generates data tables for white balance processing, and feeds it to the WB control circuit 8.

Figure 14:
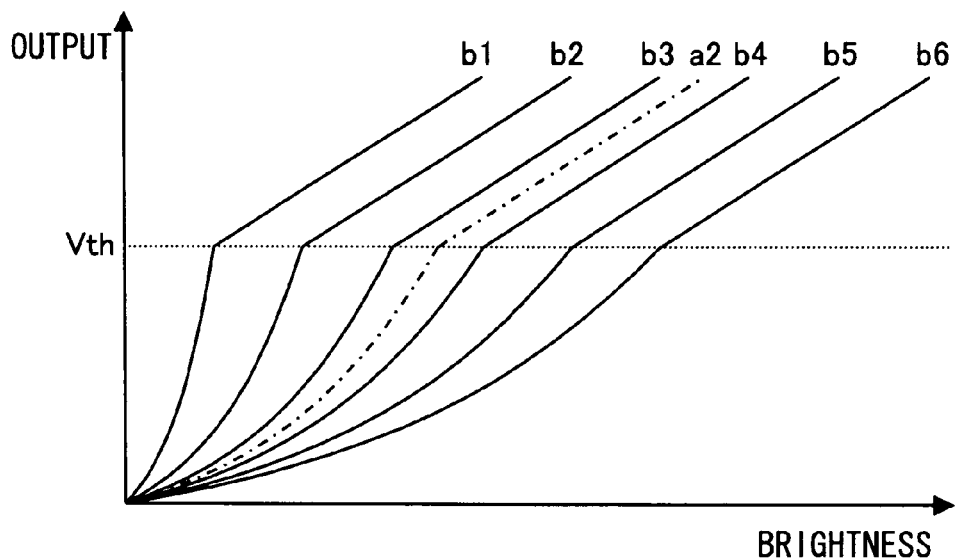
FIG. 14 is a diagram showing an example of the photoelectric conversion characteristics for the R and B signals stored in the memory of the overall controller.

At this time, in the memory 133, the photoelectric conversion characteristics for the G signals are stored discretely according to the width of the dynamic range of the solid-state image sensor 2, for example as shown in the graph of FIG. 7, and the photoelectric conversion characteristics for the R and B signals are separately stored discretely according to the WB evaluation values for each of those different dynamic ranges, for example as shown in the graph of FIG. 14. Thus, assuming that, as the photoelectric conversion characteristics for the G signals, four sets a1 to a4 of photoelectric conversion characteristics are stored as shown in the graph of FIG. 7 and, as the photoelectric conversion characteristics for the R and B signals, six sets b1 to b6 of photoelectric conversion characteristics are stored as shown in the graph of FIG. 14, then in the memory 133 are stored 4×6 sets of photoelectric conversion characteristics in total.

At this time, in the memory 133 are stored 28 sets of the parameters A and C used in formula (7) below, which expresses the linear conversion characteristics region of photoelectric conversion characteristic, and the parameters α and β used in formula (8) below, which expresses the logarithmic conversion characteristics region of photoelectric conversion characteristic. It should be noted that FIG. 14 is based on the photoelectric conversion characteristics for the G signals as set when the dynamic range corresponding to the photoelectric conversion characteristics a2 shown in FIG. 7 is selected.

$$V = A \times L + C \quad (7)$$

$$V = \alpha \times \ln(L) + \beta \quad (8)$$

When the solid-state image sensor 2 is set to have a predetermined dynamic range, the photoelectric conversion characteristics for the G signals that suit the selected dynamic range are read out from the memory 133. Moreover, when the WB evaluation values wr and wb are fed from the AE/WB evaluation value detection circuit 7, the photoelectric conversion characteristics for the R signals that suit the selected dynamic range and the WB evaluation value wr and the photoelectric conversion characteristics for the B signals that suit the selected dynamic range and the WB evaluation value wb are read out from the memory 133. Specifically, when the sensor driver 131 drives and controls the solid-state image sensor 2 so that it has a dynamic range corresponding to the photoelectric conversion characteristics a2 shown in FIG. 7, first, as the photoelectric conversion characteristics for the G signals, the photoelectric conversion characteristics a2 are read out from the memory 133. Then, when the WB evaluation value wr, which equals ΔL1, and the WB evaluation value wb, which equals -ΔL2 are fed, as the photoelectric conversion characteristics for the R signals, the photoelectric conversion characteristics b4 and, as the photoelectric conversion characteristics for the B signals, the photoelectric conversion characteristics b2 are separately read out from the memory 133.

Figure 15:
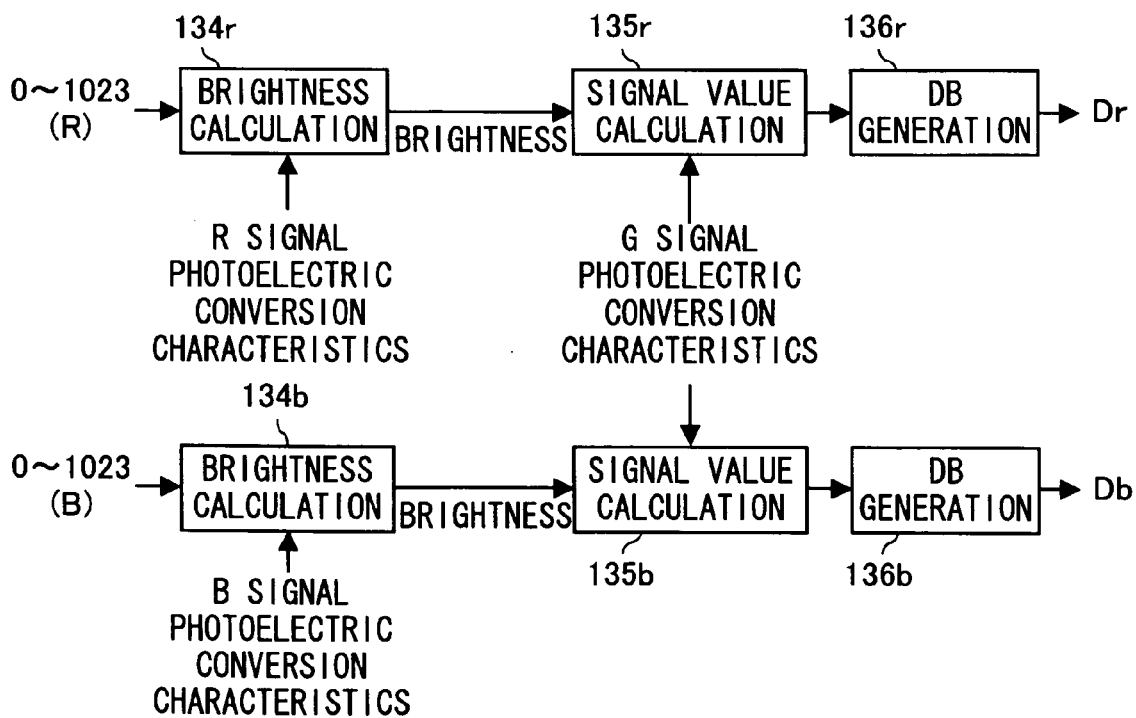
FIG. 15 is a functional block diagram showing an example of the procedure by which the overall controller generates a data table.

When the photoelectric conversion characteristics for the R, G, and B signals are separately read out from the memory 133 in this way, the microcomputer 132, by using those photoelectric conversion characteristics, generates the data tables Dr and Db for the R and B signals separately that are to be fed to the WB control circuit 8. Now, how the microcomputer 132 operates for that purpose will be described with reference to the drawings. FIG. 15 is a functional block diagram showing the flow of operations performed by the microcomputer 132 to generate data tables for the R and B signals separately. Here, it is assumed that the signal level of each R, G, or B signal is represented in 10 bits (from 0 to 1,023).

Figure 16A:
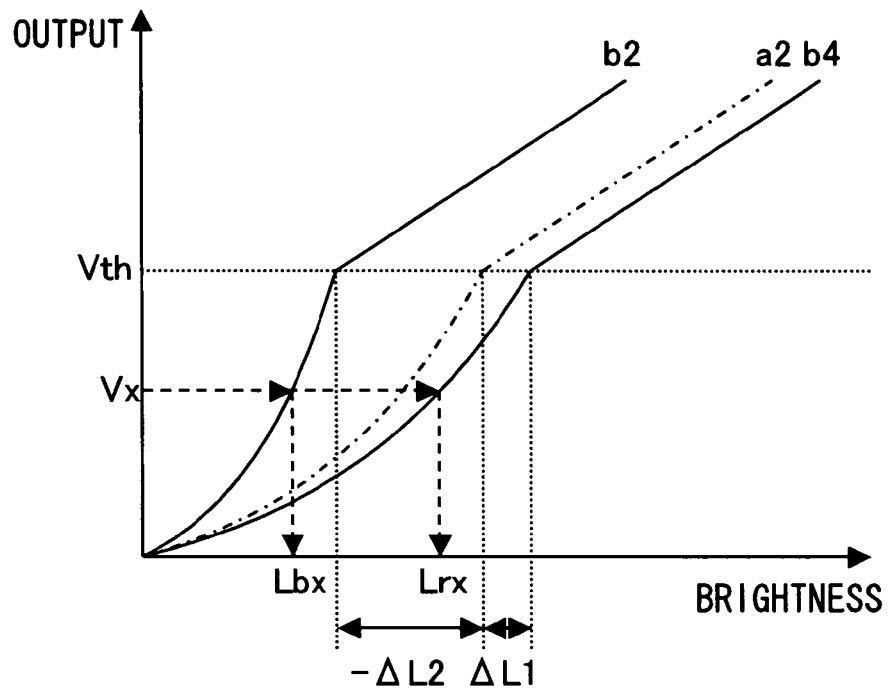
FIGS. 16A and 16B are diagrams illustrating the operation performed by the overall controller to generate a data table.

First, in a brightness calculation block 134r, the microcomputer 132 calculates the brightness values corresponding respectively to the signal levels 0 to 1,023 of the R signals on the basis of the photoelectric conversion characteristics for the R signals read out from the memory 133. Likewise, in a brightness calculation block 134b, the microcomputer 132 calculates the brightness values corresponding respectively to the signal levels 0 to 1,023 of the B signals on the basis of the photoelectric conversion characteristics for the B signals read out from the memory 133. Specifically, with respect to the R signals, the brightness values corresponding to the different signals levels are calculated on the basis of the photoelectric conversion characteristics b4, and, with respect to the B signals, the brightness values corresponding to the different signals levels are calculated on the basis of the photoelectric conversion characteristics b2. Thus, with respect to the R and B signals separately, as shown in FIG. 16A, by using the photoelectric conversion characteristics b4 and b2, the brightness values Lrx and Lbx corresponding to, for example, the signal level Vx are calculated.

Figure 16B:
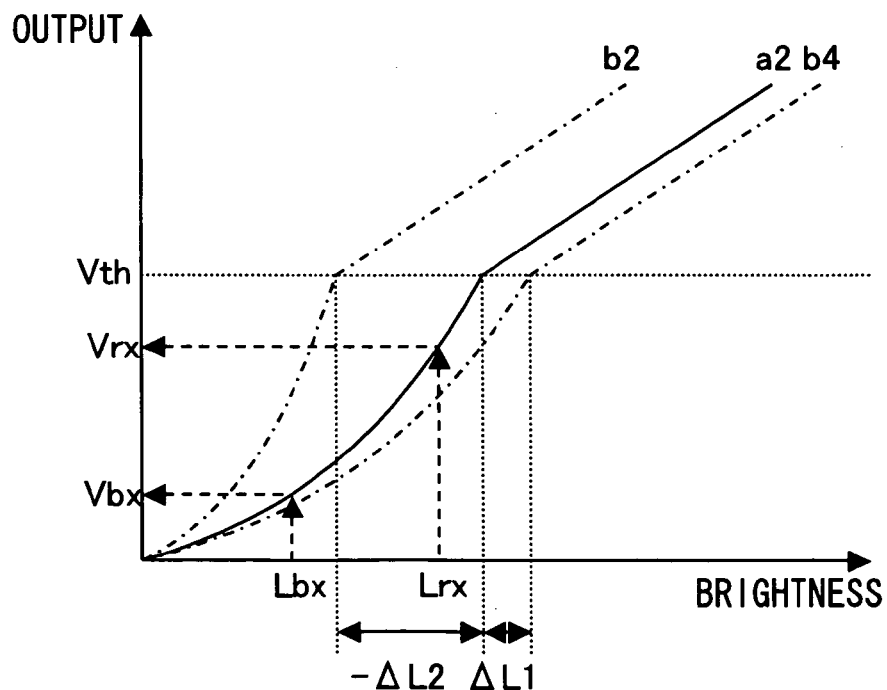

The brightness values calculated in the brightness calculation blocks 134r and 134b respectively are fed to signal value calculation blocks 135r and 135b. In the signal value calculation block 135r, on the basis of the photoelectric conversion characteristics for the G signals read out from the memory 133, the compensated signal levels corresponding respectively to the signal levels 0 to 1,023 of the R signals are calculated. Likewise, in the signal value calculation block 135b, on the basis of the photoelectric conversion characteristics for the G signals read out from the memory 133, the compensated signal levels corresponding respectively to the signal levels 0 to 1,023 of the B signals are calculated. Specifically, on the basis of the photoelectric conversion characteristics a2, the signal levels corresponding to the brightness values calculated as corresponding to the individual signal levels are calculated. Accordingly, with respect to the R and B signals separately, as shown in FIG. 16B, by the use of the photoelectric conversion characteristics a2, the corrected signal levels Vrx and Vbx corresponding to, for example, the signal level Vx are calculated from the brightness values Lrx and Lbx corresponding to the signal level Vx.

When the corrected signal levels corresponding respectively to the signal levels 0 to 1,023 are calculated with respect to the R and B signals separately, the signal value calculation blocks 135r and 135b respectively feed the corrected signal levels of the R and B signals to database generation blocks 136r and 136b. In the database generation block 136r, the signal levels 0 to 1,023 of the R signals are used as input addresses. Then, a database Dr is generated in which are stored, in a one-to-one correspondence with the input addresses 0 to 1,023, the 1,024 corrected signal levels ultimately calculated in the signal value calculation block 135r as corresponding respectively to the signal levels 0 to 1,023. Likewise, in the database generation block 136b, the signal levels 0 to 1,023 of the B signals are used as input addresses. Then, a database Db is generated in which are stored, in a one-to-one correspondence with the input addresses 0 to 1,023, the 1,024 corrected signal levels ultimately calculated in the signal value calculation block 135b as corresponding respectively to the signal levels 0 to 1,023. The thus generated databases Dr and Db are fed to the WB control circuit 8.

In the above description, the photoelectric conversion characteristics for the R, G, and B signals are separately stored in the memory 133. It is, however, also possible to store only the photoelectric conversion characteristics for the G signals, and calculate the photoelectric conversion characteristics for the R and B signals from the WB evaluation values wr and wb described earlier. For example, with respect to the R signals, the parameter A (Ar) used in formula (7) that expresses the linear characteristics region of photoelectric conversion characteristics can be calculated by the use of formulae (9) to (11) below.

$$Vth = Ag \times Lg + C \quad (9)$$

$$Vth = Ar \times (Lg + wr) + C \quad (10)$$

From formulae (9) and (10) is derived $$Ar = (Ag \times Lg)/(Lg + wr) \quad (11)$$

Here, Ag represents the photoelectric conversion coefficients for the G signals, and Lg represents the brightness of the G signal.

The logarithmic characteristics region of the R signals can be calculated in the same manner. Moreover, the photoelectric conversion characteristics for the B signals can be calculated in the same manner as with the R signals. By calculating the photoelectric conversion characteristics in this way, it is possible to achieve white balance processing with high accuracy.

SECOND EXAMPLE OF OVERALL CONTROLLER'S OPERATION FOR GENERATING DATA TABLES

Now, a description will be given of a second example of the operation performed by the overall controller to generate data tables. It should be noted that, in the following description of this example, reference is to be made to the description of the first example of the data table generating operation described above for such operations as are found also therein, and their detailed explanations will not be repeated. In this example, as opposed to in the first example, in the memory 133 are stored only the photoelectric conversion characteristics for the G signals that suit the dynamic range of the solid-state image sensor 2, and the photoelectric conversion characteristics for the R and B signals separately are generated on the basis of the photoelectric conversion characteristics read out from the memory 133.

Figure 17:
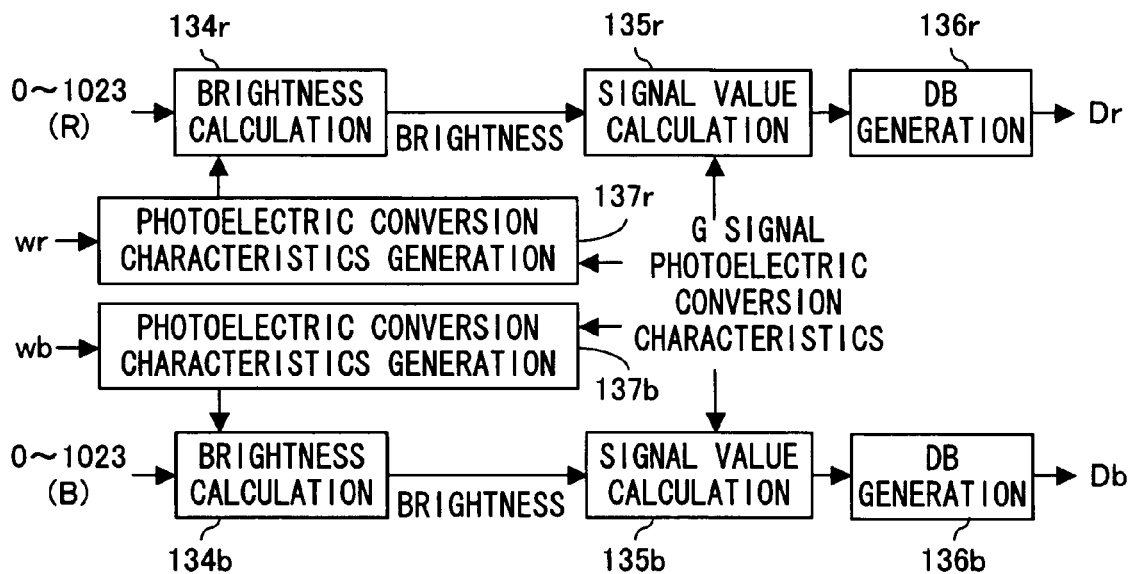
FIG. 17 is a functional block diagram showing another example of the procedure by which the overall controller generates a data table.

The data table generating operation in this example will be described with reference to FIG. 17. FIG. 17 is a functional block diagram showing the flow of operations performed by the microcomputer 132 to generate data tables for the R and B signals separately. Here, it is assumed that the signal level of each R, G, or B signal is represented in 10 bits (from 0 to 1,023). In the microcomputer 132, first, the photoelectric conversion characteristics for the G signals read out from the memory 133 and the WB evaluation value wr from the AE/WB evaluation value detection circuit 7 are fed to the photoelectric conversion characteristics generation block 137r to generate the photoelectric conversion characteristics for the R signals. Likewise, the photoelectric conversion characteristics for the G signals and the WB evaluation value wb are fed to the photoelectric conversion characteristics generation block 137b to generate the photoelectric conversion characteristics for the B signals.

Figure 18:
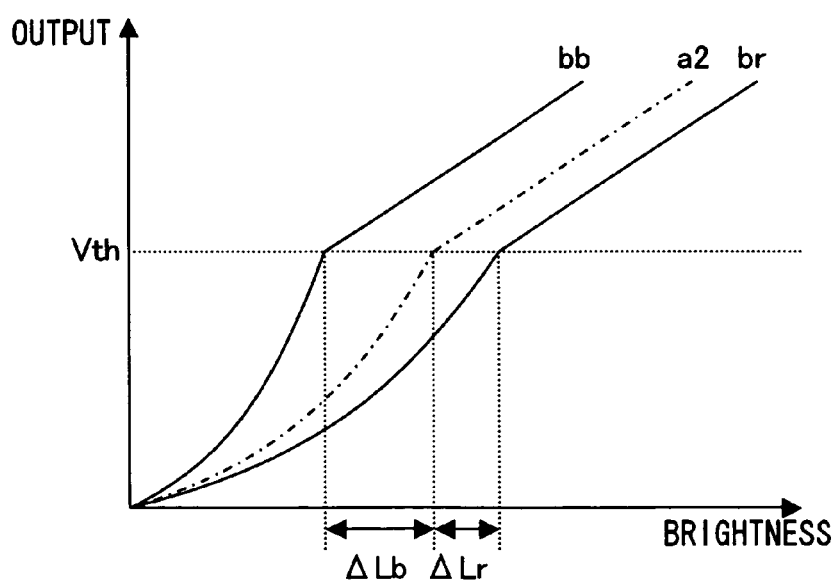
FIG. 18 is a diagram illustrating the operation performed to generate photoelectric conversion characteristics.

Specifically, when the photoelectric conversion characteristics for the G signals are read out from the memory 133, then, in the photoelectric conversion characteristics generation blocks 137r and 137b, on the basis of the WB evaluation values wr and wb respectively, the parameter A in formula (7) and the parameters $\alpha$ and $\beta$ in formula (8) are calculated to generate the photoelectric conversion characteristics for the R and B signals separately. Thus, for example, in a case where, when the dynamic range of the solid-state image sensor 2 is set, the photoelectric conversion characteristics a2 shown in FIG. 7 are read as the photoelectric conversion characteristics for the G signals and the WB evaluation values wr and wb are $\Delta$Lr and $\Delta$Lb respectively, as shown in FIG. 18, the photoelectric conversion characteristics for the R signals are photoelectric conversion characteristics br and the photoelectric conversion characteristics for the B signals are photoelectric conversion characteristics bb.

Then, the photoelectric conversion characteristics for the R and B singles generated separately in the photoelectric conversion characteristics generating blocks 137r and 137b are fed to the brightness calculation blocks 134r and 134b. Thus, when the photoelectric conversion characteristics for the R and B signals are set separately as shown in FIG. 18, in the brightness calculation block 134r, on the basis of the photoelectric conversion characteristics br, the brightness values corresponding respectively to the signal levels 0 to 1,023 of the R signals are calculated. On the other hand, in the brightness calculation block 134b, on the basis of the photoelectric conversion characteristics bb, the brightness values corresponding respectively to the signal levels 0 to 1,023 of the B signals are calculated. Thereafter, in the signal value calculation blocks 135r and 135b, on the basis of the brightness values calculated in the brightness calculation blocks 134r and 134b respectively, the corrected signal levels are calculated, and then, in the database generation blocks 136r and 136b, databases Dr and Db for the R and B signals are generated separately.

Thus, in the database Dr, the signal levels 0 to 1,023 of the R signals are used as input addresses, and, in a one-to-one correspondence with those input addresses, the corrected signal levels calculated in the signal value calculation block 135r as corresponding to the signal levels 0 to 1,023 are stored. On the other hand, in the database Db, the signal levels 0 to 1,023 of the B signals are used as input addresses, and, in a one-to-one correspondence with those input addresses, the corrected signal levels calculated in the signal value calculation block 135b as corresponding to the signal levels 0 to 1,023 are stored. Here, the brightness calculation blocks 134r and 134b, the signal value calculation blocks 135r and 135b, and the database generation blocks 136r and 136b operate as in the first example.

THIRD EXAMPLE OF OVERALL CONTROLLER'S OPERATION FOR GENERATING DATA TABLES

Now, a description will be given of a third example of the operation performed by the overall controller to generate data tables. It should be noted that, in the following description of this example, reference is to be made to the description of the second example of the data table generating operation described above for such operations as are found also therein, and their detailed explanations will not be repeated. In this example, as opposed to in the second example, after the brightness values corresponding to the signal levels of the R and B signals are calculated, AE gain adjustment and gradation conversion are performed.

Figure 19:
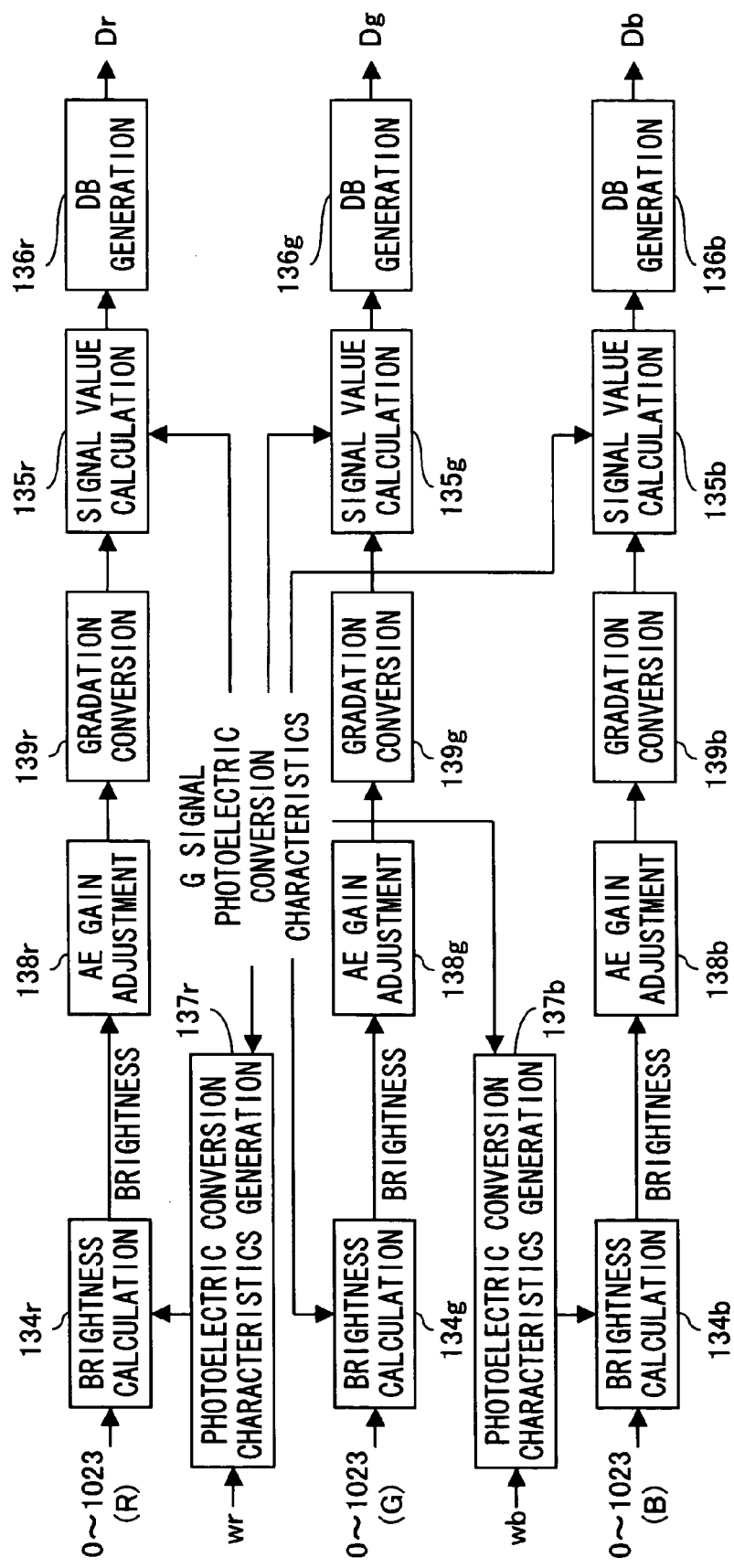
FIG. 19 is a functional block diagram showing another example of the procedure by which the overall controller generates a data table.

The data table generating operation in this example will be described with reference to FIG. 19. FIG. 19 is a functional block diagram showing the flow of operations performed by the microcomputer 132 to generate data tables for the R and B signals separately. Here, it is assumed that the signal level of each R, G, or B signal is represented in 10 bits (from 0 to 1,023). In the microcomputer 132, first, as in the second example, in the photoelectric conversion characteristics generation blocks 137r and 137b, on the basis of the photoelectric conversion characteristics for the G signals read out from the memory 133 and the WB evaluation values wr and wb from the AE/WB evaluation value detection circuit 7, the photoelectric conversion characteristics for the R and B signals are generated separately.

Then, the photoelectric conversion characteristics for the R and B signals generated separately in the photoelectric conversion characteristics generation blocks 137r and 137b are fed to the brightness calculation blocks 134r and 134b respectively, where the brightness values corresponding respectively to the signal levels 0 to 1,023 of the R signals and the brightness values corresponding respectively to the signal levels 0 to 1,023 of the B signals are calculated. Moreover, in a brightness calculation block 134g, on the basis of the photoelectric conversion characteristics for the G signals read out from the memory 133, the brightness values corresponding respectively to the signal levels 0 to 1,023 of the G signals are calculated. In this way, the brightness values corresponding to the different signal levels of the R, G, and B signals separately are fed to AE gain adjustment blocks 138r, 138g, and 138b.

Then, in the AE gain adjustment blocks 138r, 138g, and 138b, on the basis of the AE evaluation value fed from the AE/WB evaluation value detection circuit 7, the brightness values are individually amplified or reduced. The AE gain adjustment here is a process whereby the amplification factor for the brightness values is varied and thereby the gain is adjusted in order to brighten or dim the subject, i.e., to vary its lightness. Specifically, in the AE gain adjustment block 138r, the brightness values corresponding respectively to the signal levels 0 to 1,023 of the R signals are amplified or reduced by the amplification factor set according to the AE evaluation value; in the AE gain adjustment block 138g, the brightness values corresponding respectively to the signal levels 0 to 1,023 of the G signals are amplified or reduced by the amplification factor set according to the AE evaluation value; and, in the AE gain adjustment block 138b, the brightness values corresponding respectively to the signal levels 0 to 1,023 of the B signals are amplified or reduced by the amplification factor set according to the AE evaluation value.

The thus gain-adjusted brightness values corresponding respectively to the signal levels 0 to 1,023 of the R, G, and B signals are fed to the gradation conversion blocks 139r, 139g, and 139b. In the gradation conversion blocks 139r, 139g, and 139b, to give the brightness values of the R, G, and B signals separately such characteristics as produce the desired brightness when reproduced and displayed on a reproduction/output apparatus such as a monitor, the brightness values fed from the AE gain adjustment blocks 138r, 138g, and 138b are separately subjected to gradation conversion according to the gradation characteristics of the reproduction/output apparatus. Specifically, when the reproduction/output apparatus is a CRT monitor, it has gradation characteristics represented by a gamma curve. Thus, in the gradation conversion block 139r, gamma correction is performed on the gain-adjusted brightness values corresponding respectively to the signal levels 0 to 1,023 of the R signals; in the gradation conversion block 139g, gamma correction is performed on the gain-adjusted brightness values corresponding respectively to the signal levels 0 to 1,023 of the G signals; and, in the gradation conversion block 139b, gamma correction is performed on the gain-adjusted brightness values corresponding respectively to the signal levels 0 to 1,023 of the B signals.

The thus gain-adjusted and gradation-converted brightness values corresponding respectively to the signal levels 0 to 1,023 of the R, G, and B signals are fed to the signal value calculation blocks 135r, 135g, and 135b. Thereafter, in the signal value calculation blocks 135r, 135g, and 135b, on the basis of the brightness values fed from the gradation conversion blocks 139r, 139g, and 139b and the photoelectric conversion characteristics for the G signals read out from the memory 133, the corrected signal levels are calculated. Thereafter, these corrected signal levels are fed to the database generation blocks 136r, 136g, and 136b, where databases Dr, Dg, and Db for the R, G, and B signals are generated separately. Here, the signal calculation blocks 135r, 135g, and 135b and the database generation blocks 136r, 136g, and 136b operate in the same manner as the signal calculation blocks 135r and 135b and the database generation blocks 136r and 136b in the first and second examples.

Thus, the database Dg generated as described above is a database in which are stored data obtained by performing gain adjustment and gradation conversion on the G signals. On the other hand, the databases Dr and Db are databases in which are stored data obtained by performing white balance processing, gain adjustment, and gradation conversion on the R, and B signals separately. Accordingly, by performing the data table generating operation of this example, it is possible, in the WB control circuit 8, to perform white balance processing, gain adjustment, and gradation conversion on the R, G, and B signals separately. This makes it possible to omit the gradation conversion circuit 11 shown in FIG. 1.

In all the examples of the data table generating operation described above, the dynamic range of the solid-state image sensor 2 is switched discretely. In a case where the dynamic range of the solid-state image sensor 2 is varied continuously, the following operation may be performed. First, in the memory 133 are stored, as in a case where the dynamic range of the solid-state image sensor 2 is switched discretely, photoelectric conversion characteristics for a plurality of different steps. When the actually set dynamic range of the solid-state image sensor 2 (for example, the voltage level VL of the signal φVPS) has a value that comes between two discretely set dynamic ranges, the two sets of photoelectric conversion characteristics corresponding to those two discretely set dynamic ranges are read out from the memory 133.

Figure 20:
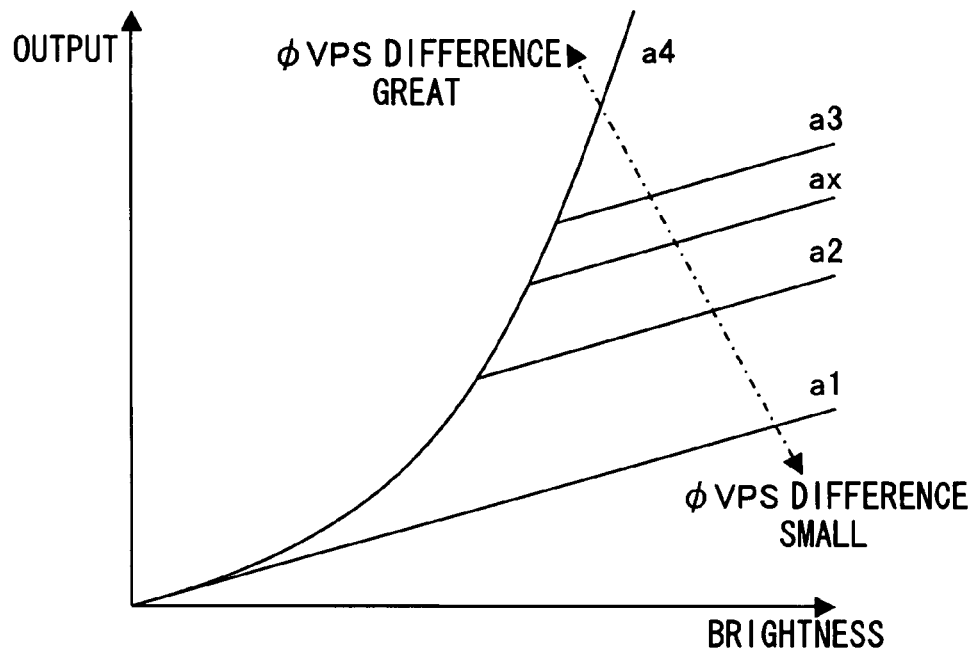
FIG. 20 is a diagram illustrating the operation performed to generate photoelectric conversion characteristics.

On the basis of the relationship between the actually set dynamic range of the solid-state image sensor 2 (for example, the voltage level VL of the signal φVPS) and the two discretely set dynamic ranges, the individual coefficients (A in formula (7) and α and β in formula (8)) of the two sets of photoelectric conversion characteristics read out form the memory 133 are interpolated so as to generate a new set of photoelectric conversion characteristics. Then, the thus generated photoelectric conversion characteristics are used as the photoelectric conversion characteristics for the G signals that suit the currently set dynamic range of the solid-state image sensor 2. Specifically, for example, suppose that, as shown in the graph of FIG. 7, four data tables corresponding to the photoelectric conversion characteristics a1 to a4 of the solid-state image sensor 2 are stored in the memory 133 and that the actually set dynamic range of the solid-state image sensor 2 is one that requires photoelectric conversion characteristics that come between the photoelectric conversion characteristics a2 and a3. Then, by interpolating the photoelectric conversion characteristics a2 and a3, the photoelectric conversion characteristics ax that suit the currently set dynamic range of the solid-state image sensor 2 are calculated as shown in FIG. 20 and are used as the photoelectric conversion characteristics for the G signals. By using the thus calculated photoelectric conversion characteristics for the G signals and the WB evaluation values wr and wb, the photoelectric conversion characteristics for the R and B signals are calculated separately. In this case, by the use of the photoelectric conversion characteristics for the G signals and the brightness difference at the threshold level Vth as obtained from the WB evaluation values wr and wb, the photoelectric conversion characteristics of the R and B signals are calculated by inverse operation.

FIRST EXAMPLE OF WB CONTROL CIRCUIT

Figure 21:
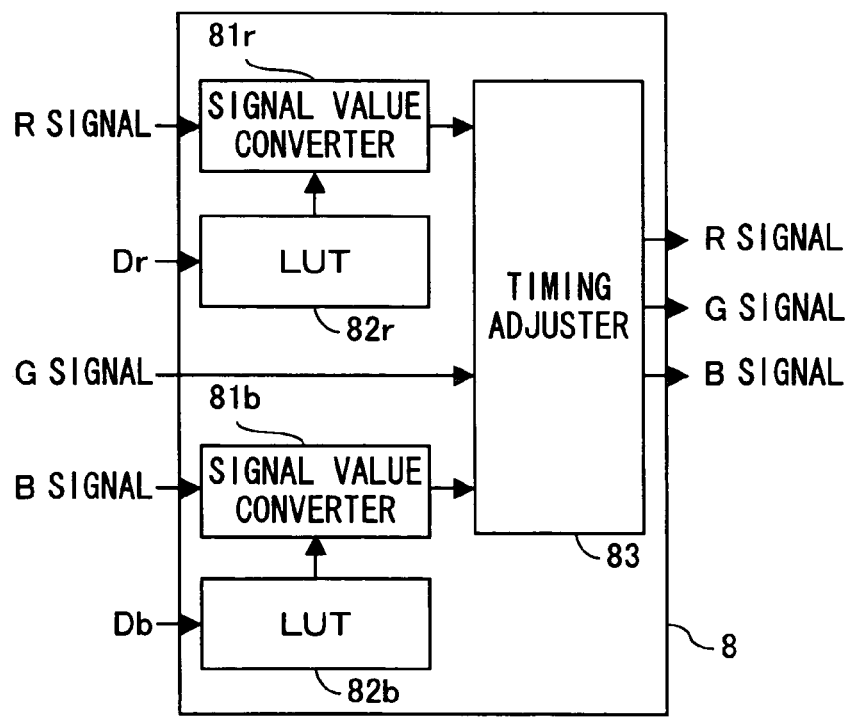
FIG. 21 is a block diagram showing an example of the internal configuration of the WB control circuit.

A first example of the WB control circuit provided in the image-sensing apparatus configured as shown in FIG. 1 will be described in detail with reference to the drawings. FIG. 21 is a block diagram showing the internal configuration of the WB control circuit of this example. The WB control circuit of this example is fed with the data tables Dr and Db generated through the first or second example of the data table generating operation performed by the overall controller.

As shown in FIG. 21, the WB control circuit 8 of this example includes a signal value converter 81r that converts the signal level of the R signal having the FPN component eliminated therefrom by the FPN correction circuit 6; a signal value converter 81b that converts the signal level of the B signal having the FPN component eliminated therefrom by the FPN correction circuit 6; an LUT (look-up table) 82r in which is stored the data table Dr, which contains values for the input/output signal level conversion of the R signals; an LUT (look-up table) 82b in which is stored the data table Db, which contains values for the input/output signal level conversion of the B signals; and a timing adjuster 83 that adjusts the output timing among the R and B signals outputted from the signal value converters 81r and 81b respectively and the G signal having the FPN components eliminated therefrom by the FPN correction circuit 6.

The WB control circuit 8 configured as described above, when fed with the data tables Dr and Db generated by the microcomputer 132 of the overall controller 13, stores those data tables Dr and Db in the LUT 82r and 82b respectively. Then, when the R, G, and B signals cleared of FPN by the FPN correction circuit 6 are fed separately to the WB control circuit 8, the R signal is fed to the signal value converter 81r and the B signal is fed to the signal value converter 81b. In the signal value converter 81r, the signal level of the R signal fed thereto is checked, and then, with reference to the data table Dr in the LUT 82r, the corrected signal level stored at the input address equal to the signal level of the R signal fed thereto is read out. Then, the corrected signal level thus read out is fed as the new signal level of the R signal to the timing adjuster 83. Likewise, in the signal value converter 81b, the signal level of the B signal fed thereto is checked, and then, with reference to the data table Db in the LUT 82b, the corresponding corrected signal level is read out. Then, this corrected signal level is fed as the new signal level of the B signal to the timing adjuster 83.

Figure 22A:
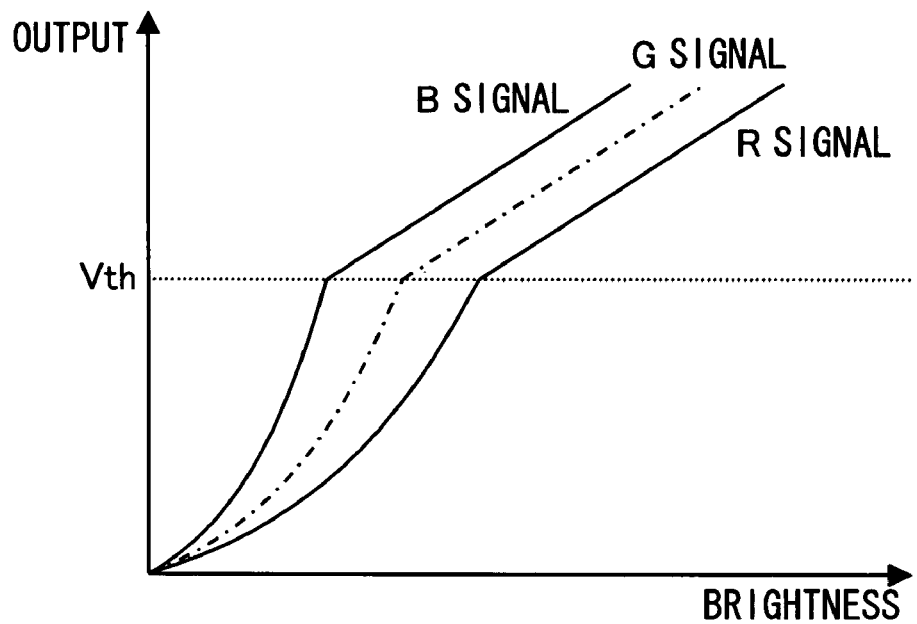
FIGS. 22A and 22B are graphs showing the relationship between the input and output of the R, G, and B signals to and from the WB control circuit.
Figure 22B:
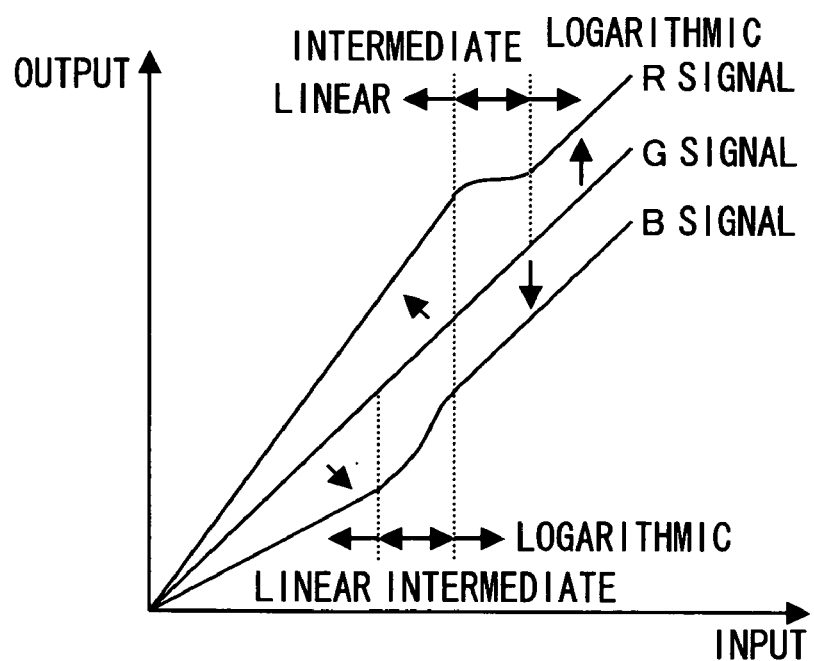

Thus, in each of the signal value converters 81r and 81b, white balance processing is performed with reference to the G signal. Here, in a case where the input R, G, and B signals have photoelectric conversion characteristics as shown in the graph of FIG. 22A, the input/output relationships of the R, G, and B signals are respectively as shown in the graph of FIG. 22B. Specifically, in FIG. 22B, the G signal has a linear input/output relationship. The R and B signals have input/output relationships that have, in their linear conversion characteristics region (linear region) that overlaps the linear conversion characteristics of the photoelectric conversion characteristics of the G signal, a slope varied from that of the input/output relationship of the G signal and, in their logarithmic conversion characteristics region (logarithmic region) that overlaps the logarithmic conversion characteristics of the photoelectric conversion characteristics of the G signal, a state translated in parallel from the input/output relationship of the G signal. Moreover, the input/output relationships of the R and B signals have, in their intermediate region where the logarithmic conversion characteristics of their photoelectric conversion characteristics overlap the linear conversion characteristics of the photoelectric conversion characteristics of the G signal or where the linear conversion characteristics of their photoelectric conversion characteristics overlap the logarithmic conversion characteristics of the photoelectric conversion characteristics of the G signal, a combined state of a state in which the input/output relationship of the G signal in the linear region is multiplied/divided and a state in which the input/output relationship of the G signal in the logarithmic region is added/subtracted.

The R and B signals thus converted to the corrected signal levels in the signal value converters 81r and 81b respectively in this way are fed, together with the G signal cleared of FPN by the FPN correction circuit 6, to the timing adjuster 83. This timing adjuster 83 adjusts the output timing between the R and B signals, which have been subjected to conversion processing by the signal value converters 81r and 81b, and the G signal, which has not been subjected to conversion processing. The R, G, and B signals thus having their output timing adjusted are then fed to the color interpolation circuit 9 provided in the succeeding stage so as to be subjected to pixel-by-pixel signal processing in the individual circuits provided in the succeeding stages.

SECOND EXAMPLE OF WB CONTROL CIRCUIT

Figure 23:
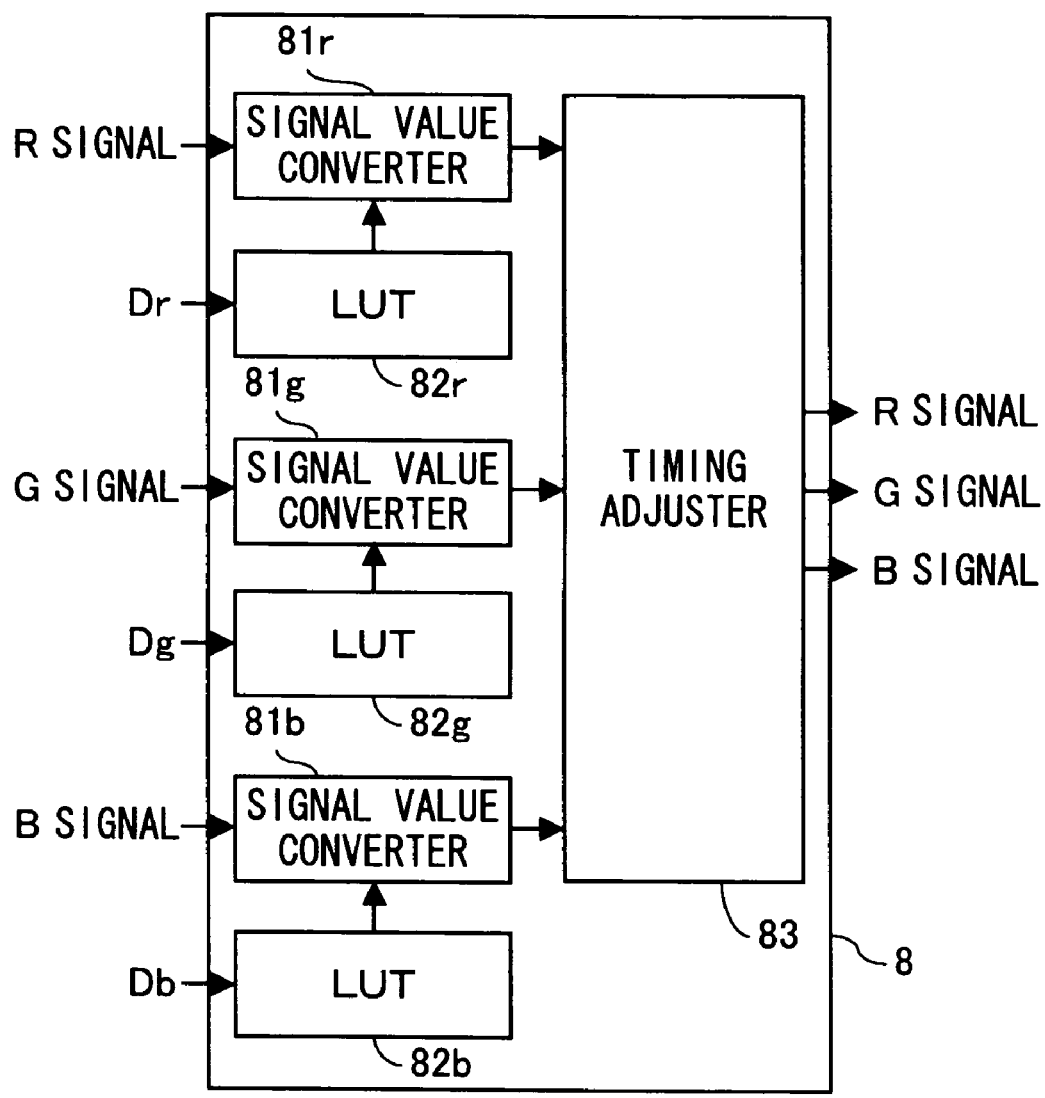
FIG. 23 is a block diagram showing another example of the internal configuration of the WB control circuit.

A second example of the WB control circuit provided in the image-sensing apparatus configured as shown in FIG. 1 will be described in detail with reference to the drawings. FIG. 23 is a block diagram showing the internal configuration of the WB control circuit of this example. The WB control circuit of this example is fed with the data tables Dr, Dg, and Db generated through the third example of the data table generating operation performed by the overall controller. It should be noted that, in the WB control circuit shown in FIG. 23, such blocks as serve the same purposes as in the WB control circuit shown in FIG. 21 are identified with the same reference numerals, and their detailed explanations will not be repeated.

As shown in FIG. 23, the WB control circuit 8 of this example includes signal value converters 81r and 81b; LUTs 82r and 82b; a signal value converter 81g that converts the signal level of the G signal having the FPN component eliminated therefrom by the FPN correction circuit 6; an LUT 82g in which is stored the data table Dg, which contains values for the input/output signal level conversion of the G signals; and a timing adjuster 83 that adjusts the output timing of the R, G, and B signals output from the signal value converters 81r, 81g, and 81b respectively.

The WB control circuit 8 configured as described above, when fed with the data tables Dr, Dg, and Db generated by the microcomputer 132 of the overall controller 13, stores those data tables Dr, Dg, and Db in the LUTs 82r, 82g, and 82b respectively. Then, when the R, G, and B signals cleared of FPN by the FPN correction circuit 6 are fed separately to the WB control circuit 8, those R, G, and B signals are fed to the signal value converters 81r, 81g, and 81b. In the signal value converters 81r and 81b, as in the first example, with reference to the data tables Dr and Db in the LUTs 82r and 82b, the corrected signal levels stored at the input addresses equal to the signal levels of the R and B signals fed thereto are read out, and are then fed, as the new signal levels of the R and B signals, to the timing adjuster 83. Likewise, in the signal value converter 81g, the signal level of the G signal fed thereto is checked, and then, with reference to the data table Dg in the LUT 82g, the corrected signal level stored at the input address equal to the signal level of the G signal fed thereto is read out and is then fed, as the new signal level of the G signal, to the timing adjuster 83.

Thus, in each of the signal value converters 81r and 81b, white balance processing is performed with reference to the G signal, and gain adjustment and gradation conversion are performed on the R and B signals. Moreover, in the signal value converter 81g, gain adjustment and gradation conversion are performed on the G signal. The R, G, and B signals thus converted to the corrected signal levels in the signal value converters 81r, 81g, and 81b respectively then have their output timing adjusted in the timing adjuster 83. The R, G, and B signals thus having their output timing adjusted are then fed to the color interpolation circuit 9 so as to be subjected to pixel-by-pixel signal processing in the circuits provided in the succeeding stages.

The embodiment described above deals with a case where variations among the pixels are eliminated within the solid-state image sensor by subtracting the noise signals from the image signals, and in which the FPN components still remaining in the image signals are eliminated by an FPN correction circuit. However, it is also possible to eliminate all the FPN components, such as result from variations among the pixels, in the FPN correction circuit, instead of reading out noise signals in the solid-state image sensor.

The embodiment described above deals with a case where a single-panel solid-state image sensor is used that has a plurality of types of color filters fitted on a single solid-state image sensor. However, it is also possible to use as many solid-state image sensors as there are different types of color filters, with each solid-state image sensor fitted with color filters of a single color, such as a three-panel solid-state image sensor composed of three solid-state image sensors each fitted with color filters of one of R, G, and B colors. The embodiment described above deals with a case where a solid-state image sensor is used of which the photoelectric conversion characteristics include a linear characteristics region and a logarithmic characteristics region. However, it is also possible to use any of the so-called adaptive sensors of which the photoelectric conversion characteristics are switchable, for example, between first linear conversion characteristics and second linear conversion characteristics with different gradients, or between linear conversion characteristics and nonlinear conversion characteristics other than logarithmic conversion characteristics.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An image-sensing apparatus comprising:
   a solid-state image sensor including:
      a plurality of pixels that perform photoelectric conversion so as to generate output signals that vary with a first characteristic in a first region such that the output signals vary linearly with respect to an amount of incident light and with a second characteristic in a second region such that the output signals vary logarithmically with respect to the amount of incident light; and
      a plurality of types of color filters provided in vicinity of the pixels; and
   a white balance circuit that performs white balance processing by performing, on at least one of different types of chrominance signals outputted as corresponding to the different types of color filters from the solid-state image sensor, different calculation operations fit respectively for the first and second characteristics in the first and second regions so as to thereby generate new output data,
   wherein the white balance circuit performs the white balance processing by performing the different calculation operations in at least three brightness regions, namely the first region in which all types of chrominance signals represent the first characteristic, the second region in which all types of chrominance signals represent the second characteristic, and a third region in which at least one of the different types of chrominance signals represents the first characteristic and at least one of the different types of chrominance signals represents the second characteristic.

2. The image-sensing apparatus as claimed in claim 1, wherein the first region is located on a lower-brightness side of the second region, and the output signals vary more greatly with the first characteristic than with the second characteristic with respect to the amount of incident light.

3. The image-sensing apparatus as claimed in claim 1, wherein the white balance circuit performs the white balance processing by, assuming that one of the different types of chrominance signals is a first chrominance signal that serves as a reference and another of the different types of chrominance signals is a second chrominance signal, performing the calculation operation on the second chrominance signal so as to make a photoelectric conversion characteristic of the second chrominance signal identical with a photoelectric conversion characteristic of the first chrominance signal.

4. The image-sensing apparatus as claimed in claim 1, wherein a switching point at which the output values of all the types of chrominance signals switch between the first and second regions is identical.

5. The image-sensing apparatus as claimed in claim 1, wherein the white balance circuit has a look-up table in which are previously stored calculation results of the calculation operations so that the white balance processing is performed by generating the new output data of the different types of chrominance signals by using the look-up table.

6. An image-sensing apparatus comprising:
   a solid-state image sensor including:
      a plurality of pixels that perform photoelectric conversion so as to generate output signals that vary with a first characteristic in a first region such that the output signals vary linearly with respect to an amount of incident light and with a second characteristic in a second region such that the output signals vary logarithmically with respect to the amount of incident light; and
      a plurality of types of color filters provided in vicinity of the pixels;
   a white balance circuit having a first look-up table in which is stored information with which to perform white balance processing on different types of chrominance signals outputted as corresponding to the different types of color filters from the solid-state image sensor, and
   an evaluation value calculation circuit that, assuming that one of the different types of chrominance signals is a first chrominance signal that serves as a reference and another of the different types of chrominance signals is a second chrominance signal, calculates, for each type of second chrominance signal, a first evaluation value that indicates a relationship between a photoelectric conversion characteristic of the first chrominance signal and a photoelectric conversion characteristic of the second chrominance signal on a basis of a relationship between average values of the first and second chrominance signals respectively as varying with the first characteristic, calculating a second evaluation value on a basis of a relationship between average values of the first and second chrominance signals respectively as varying with the second characteristic, and adding together the first and second evaluation values with weights,
   wherein the first look-up table provides, as output data, signal levels that are corrected, relative to levels of input chrominance signals, for deviations among the different types of chrominance signals in such a way as to correspond to the first and second regions, the output data being provided on a basis of the evaluation value and the photoelectric conversion characteristic of the first chrominance signal.

7. The image-sensing apparatus as claimed in claim 6, wherein the first region is located on a lower-brightness side of the second region, and the output signals vary more greatly with the first characteristic than with the second characteristic with respect to the amount of incident light.

8. The image-sensing apparatus as claimed in claim 6, wherein the first look-up table provides output data that correspond to at least three brightness regions, namely the first region in which addition and subtraction are performed among signal levels of the chrominance signals, the second region in which multiplication and division are performed among signal levels of the chrominance signals, and a third region in which addition/subtraction and multiplication/division are performed on the chrominance signals.

9. The image-sensing apparatus as claimed in claim 6, wherein the evaluation value calculation circuit sets the weights with which the first and second evaluation values are added together on a basis of a relationship between number of pixels that output signals that vary with the first characteristic with respect to the amount of incident light and number of pixels that output signals that vary with the second characteristic with respect to the amount of incident light.

10. The image-sensing apparatus as claimed in claim 6, wherein the information in the first look-up table is updated according to variation of a relationship among the signal levels of the different types of chrominance signals.

11. The image-sensing apparatus as claimed in claim 6, wherein a switching point at which the signal levels of the chrominance signals outputted from the solid-state image sensor switch between the first and second regions is variable, and the information in the first look-up table is updated according to variation of the switching point at which the signal levels of the chrominance signals switch between the first and second regions.

12. The image-sensing apparatus as claimed in claim 6, further comprising:

a second look-up table that, assuming that one of the different types of chrominance signals is a first chrominance signal that serves as a reference, has, as input addresses, signal levels of the first chrominance signal and provides, as output data, signal levels having received processing other than the white balance processing.

13. An image-sensing apparatus comprising:

a solid-state image sensor including:

a plurality of pixels that perform photoelectric conversion so as to generate output signals that vary with a first characteristic in a first region such that the output signals vary linearly with respect to an amount of incident light and with a second characteristic in a second region such that the output signals vary logarithmically with respect to the amount of incident light; and a plurality of types of color filters provided in vicinity of the pixels;

a white balance circuit having a look-up table in which is stored information with which to adjust a white balance among different types of chrominance signals outputted as corresponding to the different types of color filters from the solid-state image sensor, and an evaluation value calculation circuit that, assuming that one of the different types of chrominance signals is a first chrominance signal that serves as a reference and another of the different types of chrominance signals is a second chrominance signal, calculates, for each type of second chrominance signal, a first evaluation value that indicates a relationship between a photoelectric conversion characteristic of the first chrominance signal and a photoelectric conversion characteristic of the second chrominance signal on a basis of a relationship between average values of the first and second chrominance signals respectively as varying with the first characteristic, calculating a second evaluation value on a basis of a relationship between average values of the first and second chrominance signals respectively as varying with the second characteristic, and adding together the first and second evaluation values with weights, wherein the look-up table provides, as output data, signal levels having received white balance processing and processing other than the white balance processing.

14. The image-sensing apparatus as claimed in claim 13, wherein the look-up table provides, as output data, signal levels having received white balance processing and gradation conversion processing.

15. The image-sensing apparatus as claimed in claim 13, wherein the look-up table provides, as output data, signal levels having received white balance processing and gain adjustment processing for exposure control.

* * * * *